US012759932B2

(12) United States Patent
Hargis et al.

(10) Patent No.: US 12,759,932 B2
(45) Date of Patent: Oct. 13, 2026

(54) METHODS AND SYSTEMS TO CAPTURE CARBON DIOXIDE EMISSIONS

(71) Applicant: Arelac, Inc., San Jose, CA (US)

(72) Inventors: Craig W Hargis, Campbell, CA (US); Ryan J Gilliam, San Jose, CA (US)

(73) Assignee: Arelac, Inc., San Jose, CA (US)

( * ) Notice: Subject to any disclaimer, the term of this patent is extended or adjusted under 35 U.S.C. 154(b) by 648 days.

(21) Appl. No.: 18/122,930

(22) Filed: Mar. 17, 2023

(65) Prior Publication Data

US 2023/0295040 A1 Sep. 21, 2023

Related U.S. Application Data

(60) Provisional application No. 63/321,436, filed on Mar. 18, 2022.

(51) Int. Cl.

| | |
|---|---|
| ***C04B 7/36*** | (2006.01) |
| ***C01F 11/18*** | (2006.01) |
| ***C04B 20/02*** | (2006.01) |
| ***C04B 111/00*** | (2006.01) |

(52) U.S. Cl.

CPC ............ *C04B 7/367* (2013.01); *C01F 11/182* (2013.01); *C04B 20/0232* (2025.05); *C04B 2111/00017* (2013.01); *C04B 2111/00019* (2025.05)

(58) Field of Classification Search

CPC ........... C04B 28/04; C04B 2111/00017; C04B 28/10; C04B 7/02; C04B 14/28; C04B 7/367; C04B 7/13; C04B 7/36; C04B 12/007; C04B 22/00863; C04B 9/12; C04B 22/103; C04B 22/10; C04B 7/00; Y02P 40/18; Y02P 40/10; Y02P 20/151; Y02C 20/40

See application file for complete search history.

(56) References Cited

U.S. PATENT DOCUMENTS

| | | | |
|---|---|---|---|
| 11,377,363 | B2 | 7/2022 | Gilliam et al. |
| 11,530,164 | B2 | 12/2022 | Hargis et al. |
| 11,577,965 | B2 | 2/2023 | Weiss et al. |
| 11,667,567 | B2 | 6/2023 | Hargis et al. |
| 11,673,832 | B1 | 6/2023 | Hargis et al. |
| 2021/0017035 | A1 | 1/2021 | Weiss et al. |
| 2021/0261429 | A1 | 8/2021 | Weiss et al. |
| 2021/0403335 | A1 | 12/2021 | Gilliam et al. |
| 2022/0306483 | A1 | 9/2022 | Gilliam et al. |
| 2023/0104761 | A1 | 4/2023 | Weiss et al. |
| 2023/0107410 | A1 | 4/2023 | Weiss et al. |

(Continued)

FOREIGN PATENT DOCUMENTS

| | | | | | |
|---|---|---|---|---|---|
| GB | 282755 | A | * | 9/1928 | ............. C01C 1/244 |
| JP | 2006075717 | A | * | 3/2006 | |
| WO | WO-2018160888 | A1 | * | 9/2018 | ......... B01D 53/1425 |

OTHER PUBLICATIONS

Machine translation of JP-2006075717-A (Year: 2006).*

(Continued)

*Primary Examiner* — Amber R Orlando
*Assistant Examiner* — Ryan Patrick Loughran
(74) *Attorney, Agent, or Firm* — Schwegman Lundberg & Woessner, P.A.

(57) ABSTRACT

Provided herein are methods and systems to utilize cement or cement clinker as feedstock to capture carbon dioxide emissions and form a composition comprising calcium carbonate.

19 Claims, 4 Drawing Sheets

(56) References Cited

U.S. PATENT DOCUMENTS

| | | | |
|---|---|---|---|
| 2023/0112173 | A1 | 4/2023 | Hargis et al. |
| 2023/0118703 | A1 | 4/2023 | Weiss et al. |
| 2023/0145402 | A1 | 5/2023 | Gilliam et al. |
| 2023/0192546 | A1 | 6/2023 | Hargis et al. |

OTHER PUBLICATIONS

"International Application Serial No. PCT/US2023/015563, International Preliminary Report on Patentability mailed Oct. 3, 2024", 9 pgs.

"International Application Serial No. PCT/US2023/015563, International Search Report mailed Aug. 4, 2023", 5 pgs.

"International Application Serial No. PCT/US2023/015563, Invitation to Pay Additional Fees mailed May 23, 2023", 2 pgs.

"International Application Serial No. PCT/US2023/015563, Written Opinion mailed Aug. 4, 2023", 7 pgs.

Co-pending U.S. Appl. No. 18/136,600, inventors Hargis Craig et al., filed on Apr. 19, 2023.

Co-pending U.S. Appl. No. 18/139,815, inventors Hargis Craig; W. et al., filed on Apr. 26, 2023.

Co-pending U.S. Appl. No. 18/141,129, inventors Hargis Craig; W. et al., filed on Apr. 28, 2023.

Co-pending U.S. Appl. No. 18/200,208, inventors Michael; Joseph Weiss et al., filed on May 22, 2023.

Hargis, et al., Calcium carbonate cement: A carbon capture, utilization, and storage (CCUS) technique. Materials 2021; 14(2709) 1-12 Pages.

* cited by examiner

METHODS AND SYSTEMS TO CAPTURE CARBON DIOXIDE EMISSIONS

CROSS-REFERENCE TO RELATED APPLICATION

This application claims priority under 35 USC § 119(e) to U.S. Provisional Application Ser. No. 63/321,436, filed on Mar. 18, 2022, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion, and it creates operational, economical, and environmental problems. It may be expected that elevated atmospheric concentrations of $CO_2$ and other greenhouse gases can facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification may likely be economically expensive and environmentally hazardous if not timely handled. Reducing potential risks of climate change requires sequestration and avoidance of $CO_2$ from various anthropogenic processes.

SUMMARY

Provided herein are compositions, methods, and systems that utilize cement and/or cement clinker as a feedstock to capture $CO_2$ emissions from the cement manufacturing process and form a composition that provides equivalent or superior cementitious properties compared to the regular cement.

In one aspect, there is provided a method to form a composition, comprising: (i) dissolving cement and/or cement clinker in N-containing salt solution to produce an aqueous solution comprising calcium salt; and (ii) treating the aqueous solution comprising calcium salt with a gaseous stream comprising carbon dioxide to form a composition comprising calcium carbonate. In some embodiments of the foregoing aspect, the method further comprises forming a gaseous stream comprising ammonia in step (i); and treating the aqueous solution comprising calcium salt with the gaseous stream comprising carbon dioxide and the gaseous stream comprising ammonia to form the composition comprising calcium carbonate. In some embodiments of the foregoing aspect, the method further comprises forming a gaseous stream comprising ammonia in step (i); recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combination thereof; and treating the aqueous solution comprising calcium salt with the second aqueous solution comprising ammonium bicarbonate, ammonium carbonate, ammonia, ammonia carbamate, or combination thereof to form the composition comprising calcium carbonate.

In one aspect, there is provided a method to form a composition, comprising (i) dissolving cement and/or cement clinker in an aqueous N-containing salt solution to produce a first aqueous solution comprising calcium salt, and a gaseous stream comprising ammonia; (ii) recovering a gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combination thereof; and (iii) treating the first aqueous solution comprising calcium salt with the second aqueous solution comprising ammonium bicarbonate, ammonium carbonate, ammonia, ammonia carbamate, or combination thereof to form a composition comprising calcium carbonate.

In some embodiments of the foregoing aspects and embodiments, the cement and/or the cement clinker is Portland cement and/or Portland cement clinker. In some embodiments of the foregoing aspects and embodiments, the cement and/or the cement clinker comprises free lime, bound lime, or combination thereof. In some embodiments of the foregoing aspects and embodiments, the cement and/or the cement clinker is Portland cement and/or Portland cement clinker, wherein the Portland cement and/or the Portland cement clinker comprises free lime, bound lime, or combination thereof. In some embodiments of the foregoing aspects and embodiments, the cement and/or the cement clinker is Portland cement and/or Portland cement clinker, wherein the Portland cement and/or the Portland cement clinker comprises free lime. In some embodiments of the foregoing aspects and embodiments, the cement and/or the cement clinker is Portland cement and/or Portland cement clinker, wherein the Portland cement and/or the Portland cement clinker comprises bound lime. In some embodiments of the foregoing aspects and embodiments, the cement and/or the cement clinker comprises lime and/or one or more components selected from the group consisting of calcium carbonate, silica, aluminate, sulfate, silicate, ferrite, alite, belite, amorphous phase, and combination thereof. In some embodiments of the foregoing aspects and embodiments, the method further comprises grinding or ball milling the cement and/or the cement clinker before the dissolving step wherein the grinding or the ball milling exposes a fresh calcium rich surface.

In some embodiments of the foregoing aspects and embodiments, the method further comprises producing the cement and/or the cement clinker by calcining limestone in a kiln to produce the cement and/or the cement clinker and the gaseous stream comprising carbon dioxide. In some embodiments of the foregoing aspects and embodiments, the method further comprises obtaining the gaseous stream comprising carbon dioxide from the kiln and circulating the gaseous stream comprising carbon dioxide to the treating and/or the recovering step. In some embodiments of the foregoing aspects and embodiments, the method further comprises adding one or more of iron oxide, aluminum oxide, quartz, clay mineral, or combination thereof to the kiln and producing the cement and/or the cement clinker. In some embodiments of the foregoing aspects and embodiments, the method further comprises adding calcium sulfate to the cement and/or the cement clinker during the calcining and/or the grinding or ball milling step. In some embodiments of the foregoing aspects and embodiments, the method further comprises operating the kiln at a high lime saturation factor (LSF). In some embodiments of the foregoing aspects and embodiments, the LSF in the cement and/or the cement clinker is in a range between about 0.95-0.98 or between about 0.98-1 or above 1. In some embodiments of the foregoing aspects and embodiments, the method further comprises operating the kiln at a high lime saturation factor (LSF) in a range of between about 0.98-1 or above 1.

In some embodiments of the foregoing aspects and embodiments, the method further comprises concurrently producing pozzolanic material or C—S—H seed particle(s) in the aqueous solution, in the composition, or combination thereof. In some embodiments of the foregoing aspects and embodiments, the method further comprises forming an insoluble solid in the aqueous solution during and/or after the dissolving step. In some embodiments of the foregoing aspects and embodiments, the insoluble solid comprises kiln feed component that did not react within the kiln; undissolved clinker phase; hydrate; amorphous phase; or combination thereof. In some embodiments of the foregoing aspects and embodiments, the insoluble solid comprises pozzolanic material or C—S—H seed particle(s). In some embodiments of the foregoing aspects and embodiments, the method further comprises forming an insoluble solid in the aqueous solution during and/or after the dissolving step, wherein the insoluble solid comprises pozzolanic material or C—S—H seed particle(s). In some embodiments of the foregoing aspects and embodiments, the insoluble solid comprises pozzolanic material or C—S—H seed particle(s) and one or more components selected from the group consisting of calcium carbonate, silica, aluminate, sulfate, silicate, ferrite, alite, belite, amorphous phase, and combination thereof. In some embodiments of the foregoing aspects and embodiments, the aqueous solution comprising calcium salt or the first aqueous solution comprising calcium salt, further comprises insoluble solid. In some embodiments of the foregoing aspects and embodiments, the method further comprises separating the insoluble solid from the aqueous solution (or the first aqueous solution) before the treatment step. In some embodiments of the foregoing aspects and embodiments, the separated insoluble solid is added to the composition comprising calcium carbonate, is stored, is sold, or combination thereof. In some embodiments of the foregoing aspects and embodiments, the method further comprises separating the insoluble solid from the aqueous solution before the treatment step and adding the separated insoluble solid to the composition comprising calcium carbonate, storing, selling, or combination thereof.

In some embodiments of the foregoing aspects and embodiments, further comprising subjecting the aqueous solution comprising calcium salt and insoluble solid to the treatment step to produce the composition comprising calcium carbonate and insoluble solid, wherein the insoluble solid comprises C—S—H seed particle(s). In some embodiments of the foregoing aspects and embodiments, the method further comprises providing acceleration of hydration of the composition comprising calcium carbonate, acceleration of precipitation of the composition comprising calcium carbonate, reduction of median particle size of the composition comprising calcium carbonate, or combination thereof, by the insoluble solid comprising C—S—H seed particle(s). In some embodiments of the foregoing aspects and embodiments, the method further comprises providing acceleration of hydration of the composition comprising calcium carbonate, increased strength, increased durability, and/or reduced permeability by the insoluble solid comprising pozzolanic material and/or C—S—H nucleation site.

In some embodiments of the foregoing aspects and embodiments, the aqueous solution comprises calcium salt and insoluble solid, wherein the insoluble solid comprises one or more components selected from the group consisting of calcium carbonate, silica, aluminate, sulfate, silicate, ferrite, alite, belite, amorphous phase, and combination thereof. In some embodiments of the foregoing aspects and embodiments, the first aqueous solution comprises calcium salt and insoluble solid, wherein the insoluble solid comprises one or more components selected from the group consisting of calcium carbonate, silica, aluminate, sulfate, silicate, ferrite, alite, belite, amorphous phase, and combination thereof.

In some embodiments of the foregoing aspects and embodiments, the composition comprises calcium carbonate and insoluble solid, wherein the insoluble solid comprises C—S—H seed particle(s) and one or more components selected from the group consisting of calcium carbonate, silica, aluminate, sulfate, silicate, ferrite, alite, belite, amorphous phase, and combination thereof.

In some embodiments of the foregoing aspects and embodiments, the insoluble solid is between about 1-85 wt % in the aqueous solution (or in the first aqueous solution), in the composition, or combination thereof.

In some embodiments of the foregoing aspects and embodiments, the cement is a blend comprising Portland cement or Portland cement clinker and one or more components selected from the group consisting of gypsum, aluminosilicate material, and combination thereof. In some embodiments of the foregoing aspects and embodiments, the aluminosilicate material comprises heat-treated clay or shale, natural or artificial pozzolan, granulated blast furnace slag, or combination thereof. In some embodiments of the foregoing aspects and embodiments, the heat-treated clay comprises calcined clay, aluminosilicate glass, calcium aluminosilicate glass, or combination thereof.

In some embodiments of the foregoing aspects and embodiments, the N-containing salt is N-containing inorganic salt, N-containing organic salt, or combination thereof. In some embodiments of the foregoing aspects and embodiments, the N-containing inorganic salt is selected from the group consisting of ammonium halide, ammonium acetate, ammonium sulfate, ammonium sulfite, ammonium nitrate, ammonium nitrite, and combination thereof. In some embodiments of the foregoing aspects and embodiments, the N-containing salt is ammonium halide. In some embodiments of the foregoing aspects and embodiments, the N-containing salt is ammonium chloride or ammonium acetate. In some embodiments of the foregoing aspects and embodiments, molar ratio of the N-containing salt:calcium oxide in the cement and/or the cement clinker is between about 3:1 to 1:1.

In some embodiments of the foregoing aspects and embodiments, the dissolving step comprises one or more dissolution conditions selected from the group consisting of temperature between about 10-200° C.; pressure between about 0.1-10 atm; N-containing salt wt % in water between about 0.5-50%; and combination thereof.

In some embodiments of the foregoing aspects and embodiments, no external source of carbon dioxide and/or ammonia is used, and the process is a closed loop process.

In some embodiments of the foregoing aspects and embodiments, the gaseous stream comprising ammonia further comprises water vapor. In some embodiments of the foregoing aspects and embodiments, the gaseous stream further comprises between about 20-90% water vapor. In some embodiments of the foregoing aspects and embodiments, no external water is added to the cooling process. In some embodiments of the foregoing aspects and embodiments, the cooling process comprises one or more cooling conditions comprising temperature between about 0-100° C.; pressure between about 0.5-50 atm; pH of the aqueous solution between about 7-12; flow rate of the $CO_2$; ratio of $CO_2$:$NH_3$ between about 0.1:1-20:1; or combination thereof.

In some embodiments of the foregoing aspects and embodiments, the second aqueous solution is formed by condensation of the gases.

In some embodiments of the foregoing aspects and embodiments, the treating process comprises one or more precipitation conditions selected from the group consisting of pH of the first aqueous solution of between about 7-9, temperature of the solution between about 20-60° C., residence time of between about 5-60 minutes, or combination thereof.

In some embodiments of the foregoing aspects and embodiments, the composition and/or supernatant solution comprise residual N-containing inorganic salt. In some embodiments of the foregoing aspects and embodiments, the residual N-containing inorganic salt comprises ammonium halide, ammonium acetate, ammonium sulfate, ammonium sulfite, ammonium hydrosulfide, ammonium thiosulfate, ammonium nitrate, ammonium nitrite, or combination thereof. In some embodiments of the foregoing aspects and embodiments, the method further comprises recovering the residual N-containing inorganic salt using recovery process selected from the group consisting of thermal decomposition, pH adjustment, reverse osmosis, multi-stage flash distillation, multi-effect distillation, vapor recompression, distillation, and combination thereof. In some embodiments of the foregoing aspects and embodiments, the step of removing and optionally recovering the residual N-containing inorganic salt from the composition comprises heating the composition between about 80-380° C. to evaporate the N-containing inorganic salt from the composition with optional recovery by condensation of the N-containing inorganic salt.

In some embodiments of the foregoing aspects and embodiments, the composition comprising calcium carbonate is a crystalline calcium carbonate, amorphous calcium carbonate, or combination thereof. In some embodiments of the foregoing aspects and embodiments, the calcium carbonate is in polymorphic form of vaterite, aragonite, calcite, or combination thereof. In some embodiments of the foregoing aspects and embodiments, the vaterite is reactive vaterite or stable vaterite. In some embodiments of the foregoing aspects and embodiments, the composition comprising calcium carbonate is cementitious and the method further comprises forming a cementitious product from the composition. In some embodiments of the foregoing aspects and embodiments, the method further comprises adding water to the composition comprising calcium carbonate wherein the calcium carbonate is in polymorphic form of reactive vaterite and transforming the reactive vaterite to aragonite and/or calcite that sets and hardens to form cement or cementitious product.

In some embodiments of the foregoing aspects and embodiments, the cementitious product is a building material and/or a formed building material. In some embodiments of the foregoing aspects and embodiments, the cementitious product is a building material and/or a formed building material selected from masonry unit, construction panel, conduit, basin, beam, column, slab, acoustic barrier, insulation material, and combination thereof. In some embodiments of the foregoing aspects and embodiments, the cementitious product is aggregate and/or aerated concrete. In some embodiments of the foregoing aspects and embodiments, the cementitious product is lightweight aggregate. In some embodiments of the foregoing aspects and embodiments, the cementitious product is building material, formed building material, aggregate, aerated concrete, or combination thereof.

In one aspect, there is provided a method to form a composition, comprising:

(i) calcining limestone in a kiln to produce cement and/or the cement clinker and a gaseous stream comprising carbon dioxide gas and oxygen gas;

(ii) dissolving the cement and/or the cement clinker in N-containing salt solution to produce an aqueous solution comprising calcium salt;

(iii) treating the aqueous solution comprising calcium salt with the gaseous stream comprising carbon dioxide gas and oxygen gas to form a composition comprising calcium carbonate and residual N-containing salt;

(iv) heating the composition comprising calcium carbonate and residual N-containing salt to form ammonia gas; and (v) passing a slipstream of the gaseous stream comprising carbon dioxide gas and oxygen gas over the heated composition to sweep the ammonia gas.

In one aspect, there is provided a product formed by the method according to any one of the foregoing aspects and embodiments.

In one aspect, there is provided a system to form a composition, comprising (i) a dissolution reactor configured for dissolving cement and/or cement clinker in N-containing salt solution to produce an aqueous solution comprising calcium salt and a gaseous stream comprising ammonia; and (ii) a treatment reactor operably connected to the dissolution reactor and configured for treating the aqueous solution comprising calcium salt with a gaseous stream comprising carbon dioxide and the gaseous stream comprising ammonia to form a composition comprising calcium carbonate. In one aspect, there is provided a system to form a composition, comprising (i) a dissolution reactor configured for dissolving cement and/or cement clinker in a N-containing salt solution to produce an aqueous solution comprising calcium salt and a gaseous stream comprising ammonia; (ii) a cooling reactor operably connected to the dissolution reactor and configured for recovering a gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combination thereof; and (iii) a treatment reactor operably connected to the cooling reactor and the dissolution reactor, and configured for treating the aqueous solution comprising calcium salt with the second aqueous solution comprising ammonium bicarbonate, ammonium carbonate, ammonia, ammonia carbamate, or combination thereof to form a composition comprising calcium carbonate. In some embodiments of the foregoing aspect, the dissolution reactor is integrated with the cooling reactor.

In some embodiments of the foregoing aspects and embodiments, the system further comprises a calcining reactor configured to calcine limestone to form the cement and/or the cement clinker and the gaseous stream comprising carbon dioxide. In some embodiments of the foregoing aspects and embodiments, the system further comprises means for transferring the gaseous stream comprising carbon dioxide from the calcining reactor to the treatment reactor and/or the cooling reactor. In some embodiments of the foregoing aspects and embodiments, the aqueous solution (or the first aqueous solution) comprising calcium salt and/or the composition comprising calcium carbonate further comprises insoluble solid, wherein the insoluble solid comprises C—S—H seed particle(s).

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
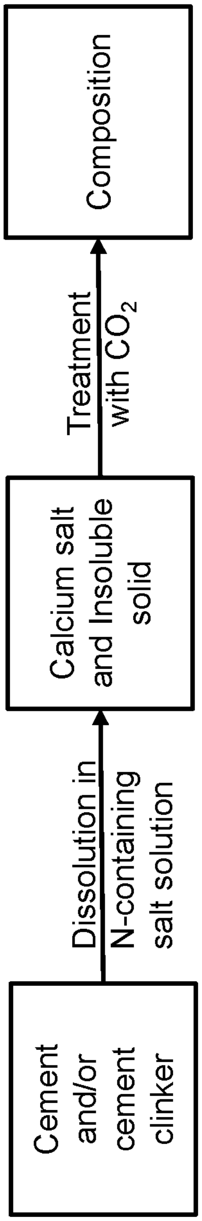
FIG. 1 illustrates some embodiments of the methods and systems provided herein related to forming the composition comprising calcium carbonate by capturing the carbon dioxide emissions and using the cement and/or the cement clinker as the feedstock.

Cement is a significant contributor to global $CO_2$ emissions with over 1.5 billion metric tons emitted per year, corresponding to about 5% of total emissions. Over 50% of the cement emissions may result from the release of the $CO_2$ from the decomposition of the limestone feedstock ($CaCO_3 \rightarrow CaO+CO_2$). For example, Portland cement clinker is produced through the calcination of limestone with siliceous, aluminous, and ferrous raw materials at 1450-1500° C. in a rotary kiln. The energy consumption needed to heat the material to this high temperature combined with the chemical decomposition of the limestone which liberates $CO_2$ to the atmosphere may result in an emission of typically 0.8 kg $CO_2$ per kg clinker produced. The methods and systems provided herein are related to reducing the $CO_2$ emissions associated with the production of the cement, e.g., Portland cement or Portland cement clinker.

In the methods and systems provided herein, the emissions of the $CO_2$ from the calcination of the limestone and/or any other feedstock may be avoided by recapturing it back in the process to make the composition comprising calcium carbonate. The composition comprising calcium carbonate thus formed may be cementitious itself or may be added to the cementitious materials. By recapturing the $CO_2$, the composition has the potential to eliminate significant amount of the cement. $CO_2$ emissions and total global emissions from all sources.

I. Methods and Systems

Provided herein are unique methods and systems that use the cement and/or the cement clinker and the $CO_2$ emissions from the cement making process to form the composition comprising calcium carbonate which can be used to form various products as described herein. In some embodiments, the calcium carbonate is a crystalline calcium carbonate, amorphous calcium carbonate, or combination thereof. In some embodiments, the crystalline calcium carbonate is in polymorphic form of vaterite, aragonite, calcite, or combination thereof. In some embodiments, the calcium carbonate is precipitated calcium carbonate (PCC). In some embodiments, the vaterite is reactive vaterite or stable vaterite. In some embodiments, the reactive vaterite in the composition possesses unique properties, including, but not limited to, cementing properties by transforming to aragonite and/or calcite which sets and hardens into the cement with high compressive strength. In some embodiments, the reactive vaterite cement transformation to the aragonite and/or the calcite results in cement that can be used to form building material and/or cementitious product such as, but not limited to, formed building material such as construction panel, aerated concrete, aggregate, e.g., lightweight aggregate, etc. further described herein. In some embodiments, where the calcium carbonate is formed as precipitated calcium carbonate (PCC), the PCC material may be used as a filler in products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof.

The composition comprising calcium carbonate provided herein can be used to replace Ordinary Portland Cement (OPC) either entirely in cementitious applications or partially as a supplementary cementitious material (SCM). The methods and systems provided herein have several advantages, such as but not limited to, reduction of the carbon dioxide emissions through the incorporation of the carbon dioxide back into the process to form the composition comprising calcium carbonate and reduction in carbon footprint.

In one aspect, there are provided methods to form the composition, comprising (i) dissolving the cement and/or the cement clinker in the N-containing salt solution to produce the aqueous solution comprising calcium salt; and (ii) treating the aqueous solution comprising calcium salt with the gaseous stream comprising carbon dioxide to form the composition comprising calcium carbonate.

Illustrated in FIG. 1 for example, are methods and systems where the cement and/or the cement clinker is dissolved in an aqueous solution comprising N-containing salt solution which results in the formation of the aqueous solution comprising calcium salt and an insoluble solid. The aqueous solution comprising calcium salt and optionally the insoluble solid is treated with the gaseous stream comprising $CO_2$ to form the composition comprising calcium carbonate.

Figure 2:
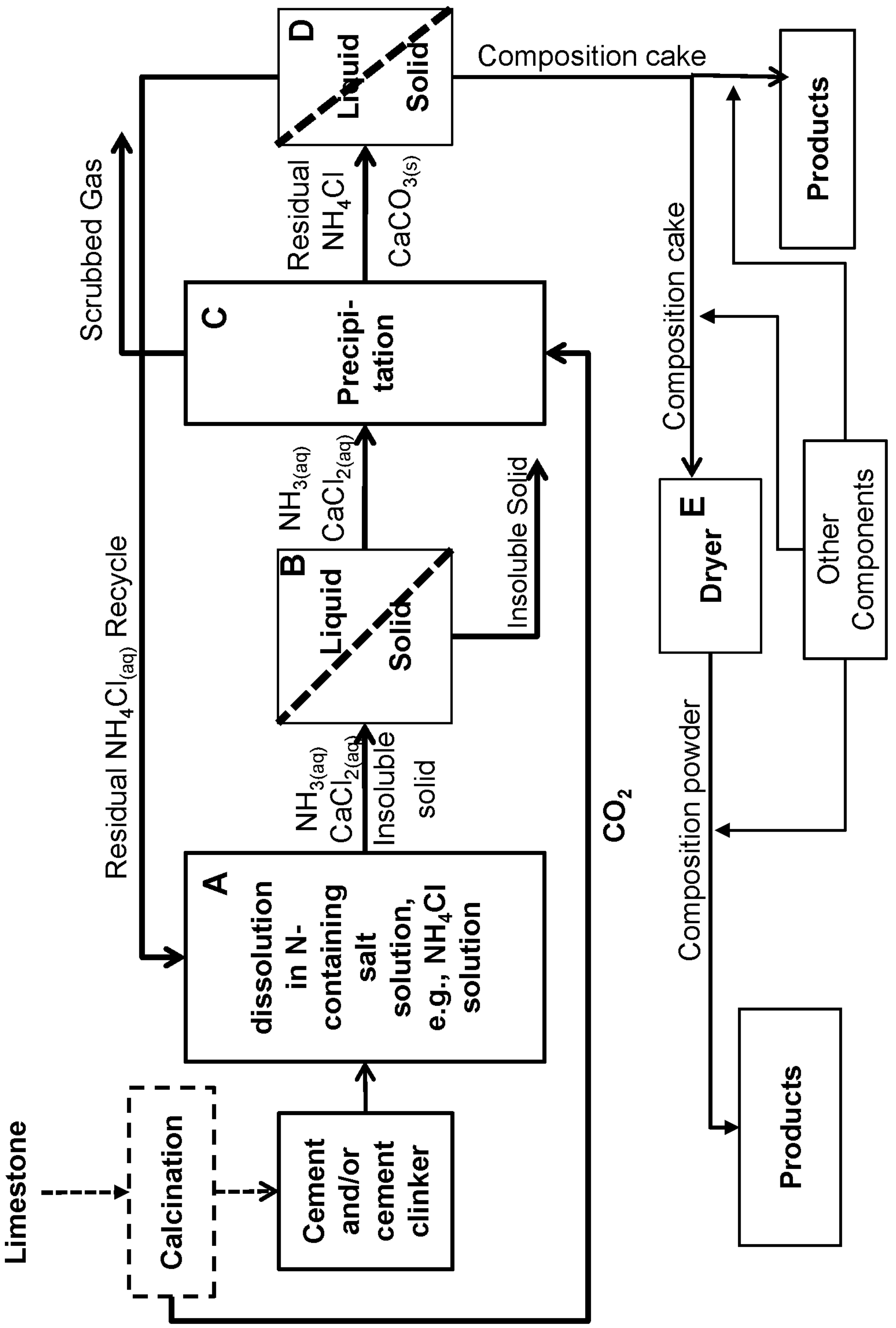
FIG. 2 illustrates some embodiments of the methods and systems provided herein related to forming the composition comprising calcium carbonate by capturing the carbon dioxide emissions and using the cement and/or the cement clinker as the feedstock.
Figure 3:
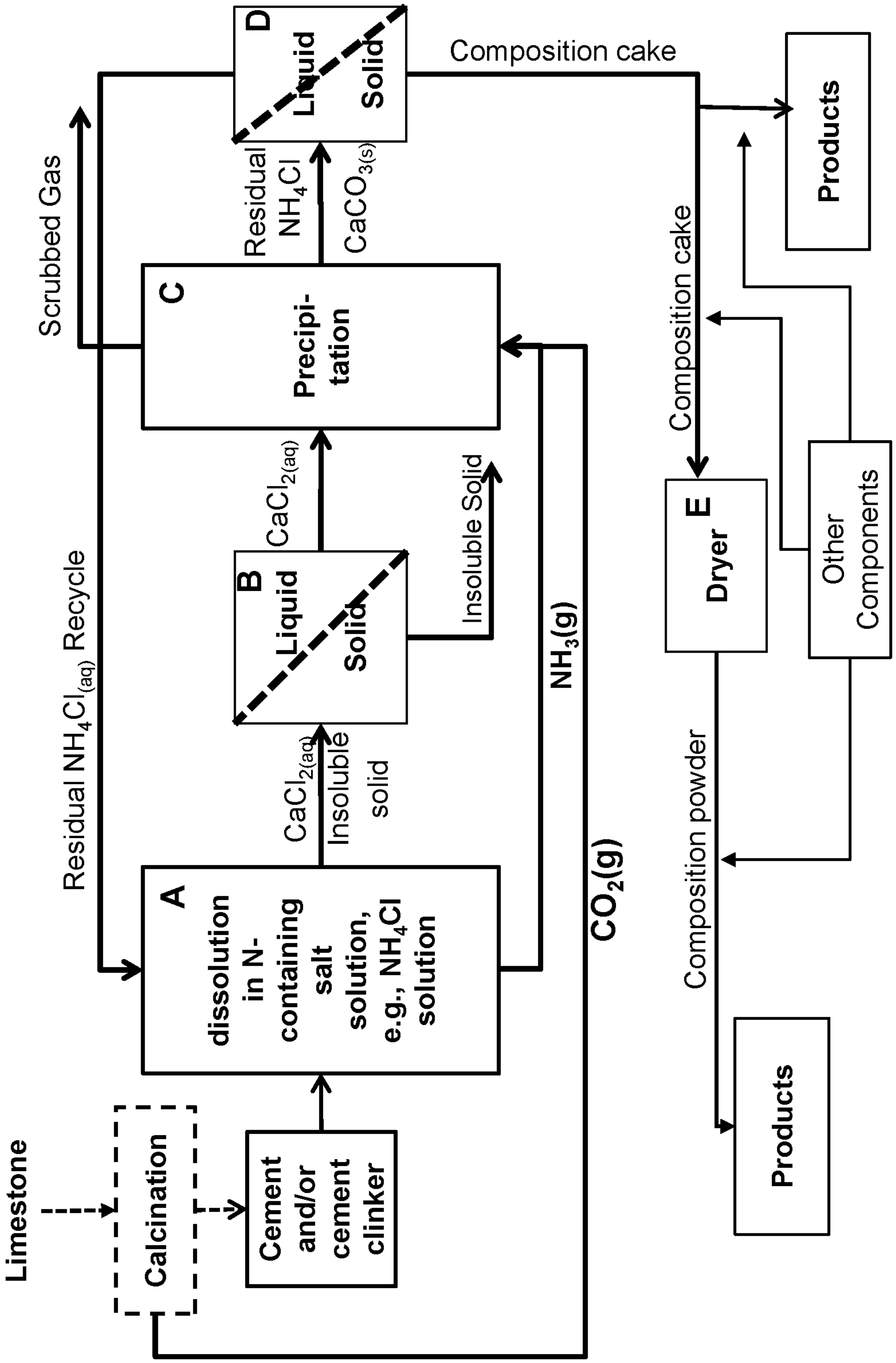
FIG. 3 illustrates some embodiments of the methods and systems provided herein related to forming the composition comprising calcium carbonate by capturing the carbon dioxide emissions and using the cement and/or the cement clinker as the feedstock.
Figure 4:
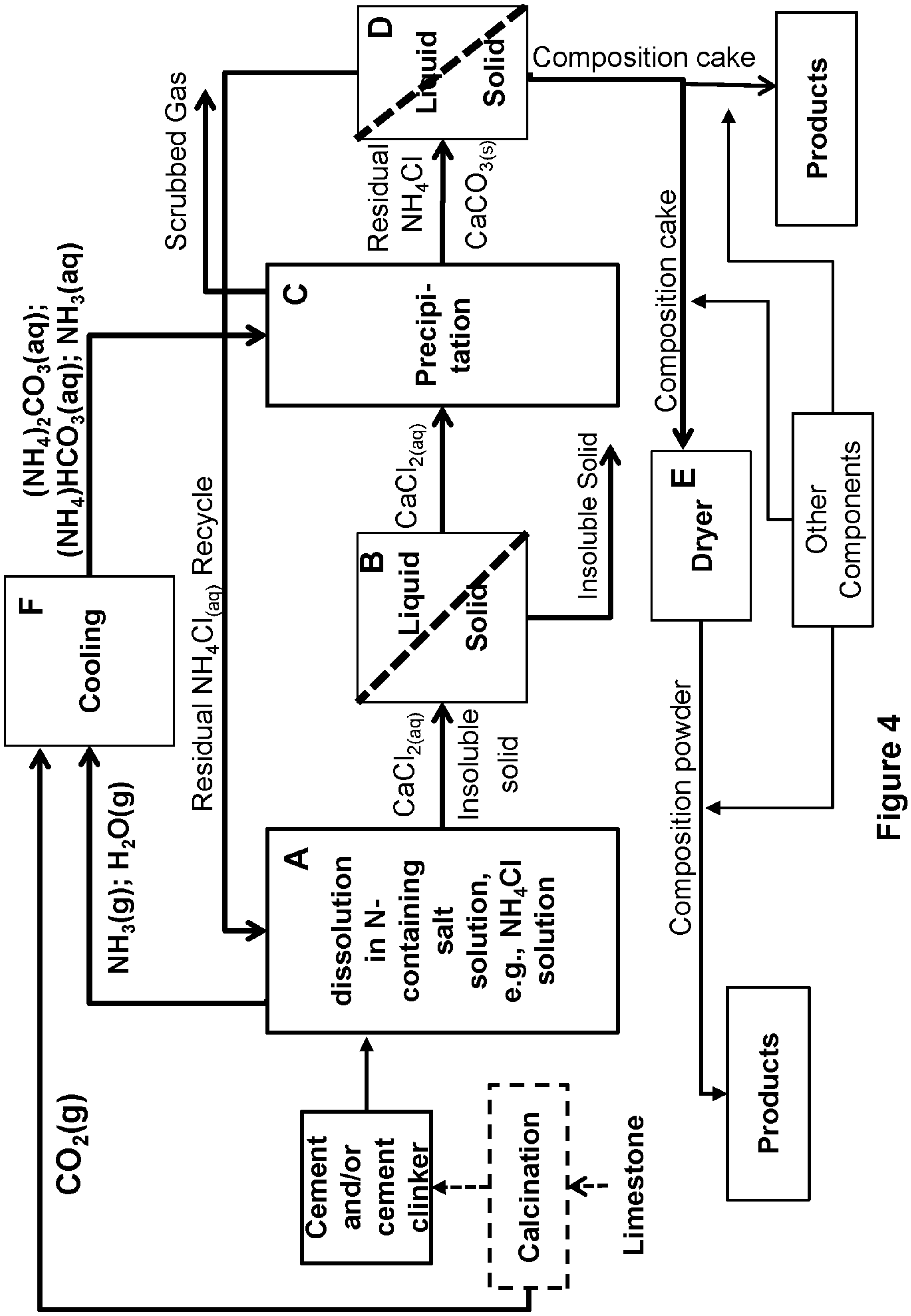
FIG. 4 illustrates some embodiments of the methods and systems provided herein related to forming the composition comprising calcium carbonate by capturing the carbon dioxide emissions and using the cement and/or the cement clinker as the feedstock.

Some detailed aspects and embodiments of the methods and systems provided herein are as illustrated in FIGS. 2-4. It is to be understood that the steps illustrated in FIGS. 1-4 may be modified or the order of the steps may be changed or more steps may be added or deleted depending on the desired outcome. As illustrated in FIGS. 1-4, the cement and/or the cement clinker is a feedstock to the methods and systems provided herein that capture carbon dioxide emissions from the cement manufacturing process to produce the composition comprising calcium carbonate.

The "cement" used as a feedstock in the methods and systems described herein, includes any cement or concrete or mortar or stucco that comprises and/or generates a calcium component, a lime component or a calcium salt. The "cement clinker" used as a feedstock in the methods and systems described herein, includes any cement clinker that comprises and/or generates a calcium component, a lime component or a calcium salt. The cement clinker typically may be in nodule form or in ground form. The "lime" as used herein relates to calcium oxide and/or calcium hydroxide and/or a derivative thereof. The presence and amount of the calcium oxide and/or the calcium hydroxide in the lime would vary depending on the conditions for the lime formation. For example, the lime may be free lime and/or bound lime in the cement and/or the cement clinker, as described further herein.

The cement and/or the cement clinker feedstock in the methods and systems provided herein can be any cement and/or the cement clinker (including concrete or mortar) known in the art. For example, in some embodiments the cement or its clinker form includes, but not limited to, Portland cement (or Ordinary Portland Cement (OPC)), white Portland cement, Portland cement clinker, Portland pozzolan cement, rapid hardening cement, quick setting cement, low heat cement, sulfate resisting cement, blast furnace slag cement, high alumina cement, colored cement, air entraining cement, expansive cement, hydrographic or hydrophobic cement, calcium aluminate cement, calcium sulfoaluminate cement, natural cement, or combinations thereof. In some embodiments, the cement includes cement blends of the cement and/or the cement clinker, such as, but not limited to, Portland-limestone cement, Portland-slag cement, Portland-pozzolan cement, ternary blended cement, or combinations thereof. All of these cements and/or the cement clinkers are well known in the art and are commercially available. In some embodiments, the cement and/or the cement clinker includes cement or concrete or mortar with varying compositions including lime or any form of calcium and optionally one or more components selected from the group consisting of calcium carbonate, silica, aluminate, sulfate, silicate, ferrite, alite, belite, amorphous phase, and combinations thereof. In some embodiments, the cement includes cement blend comprising cement and/or the cement clinker such as Portland cement or cement clinker and one or more components selected from the group consisting of gypsum, aluminosilicate material, and combination thereof. In some embodiments, the aluminosilicate material comprises heat-treated clay or shale, natural or artificial pozzolan, granulated blast furnace slag, or combination thereof. In some embodiments, the heat-treated clay comprises calcined clay, aluminosilicate glass, calcium aluminosilicate glass, or combination thereof.

In some embodiments, the lime present in the cement and/or the cement clinker is free lime or bound lime. In some embodiments, the cement and/or the cement clinker comprises free lime. For example, in some embodiments, the Portland cement and/or the Portland cement clinker comprises free lime. In some embodiments, the Portland cement and/or the Portland cement clinker comprising free lime are subjected to the methods and systems provided herein to extract the free lime from the Portland cement and/or the Portland cement clinker and use it to form the composition comprising calcium carbonate. The “free lime” used herein includes unreacted calcium oxide remaining in the cement and/or the clinker after the calcination of the feedstock such as e.g., limestone. The “bound lime” used herein includes calcium oxide bound to the other elements in the cement and/or the clinker after the calcination of the feedstock.

In one aspect, there are provided methods to form the composition, comprising (i) dissolving the cement and/or the cement clinker comprising free lime, bound lime, or combination thereof, in the N-containing salt solution to produce the aqueous solution comprising calcium salt; and (ii) treating the aqueous solution comprising calcium salt with the gaseous stream comprising carbon dioxide to form the composition comprising calcium carbonate. In some embodiments, there are provided methods to form the composition, comprising (i) dissolving the Portland cement and/or the Portland cement clinker comprising free lime, bound lime, or combination thereof, in the N-containing salt solution to produce the aqueous solution comprising calcium salt; and (ii) treating the aqueous solution comprising calcium salt with the gaseous stream comprising carbon dioxide to form the composition comprising calcium carbonate.

In one aspect, there are provided methods to form the composition, comprising (i) dissolving the cement and/or the cement clinker comprising free lime in the N-containing salt solution to produce the aqueous solution comprising calcium salt; and (ii) treating the aqueous solution comprising calcium salt with the gaseous stream comprising carbon dioxide to form the composition comprising calcium carbonate. In some embodiments, there are provided methods to form the composition, comprising (i) dissolving the Portland cement and/or the Portland cement clinker comprising free lime in the N-containing salt solution to produce the aqueous solution comprising calcium salt; and (ii) treating the aqueous solution comprising calcium salt with the gaseous stream comprising carbon dioxide to form the composition comprising calcium carbonate.

As illustrated in FIGS. 2-4, in some embodiments of the aforementioned aspects and embodiments, the methods further comprise producing the cement and/or the cement clinker by calcining limestone in a kiln to produce the cement and/or the cement clinker and a gaseous stream comprising carbon dioxide. It is to be understood that the limestone illustrated in the figures and the description herein is for illustration purposes only and any other feedstock (including limestone in combination with other components or any other feedstock) producing the cement and/or the cement clinker is well within the scope of the invention. In some embodiments of the aforementioned aspect and embodiments, the method further comprises transferring the gaseous stream comprising carbon dioxide from the process of the calcination of the limestone to the treating step (ii).

In one aspect, there are provided methods to form the composition, comprising (i) calcining limestone in the kiln to produce the cement and/or the cement clinker and the gaseous stream comprising carbon dioxide; (ii) dissolving the cement and/or the cement clinker in N-containing salt solution to produce the aqueous solution comprising calcium salt; and (iii) treating the aqueous solution comprising calcium salt with the gaseous stream comprising carbon dioxide to form the composition comprising calcium carbonate. In some embodiments, there are provided methods to form the composition, comprising (i) calcining limestone in the kiln to produce the Portland cement and/or the Portland cement clinker and the gaseous stream comprising carbon dioxide; (ii) dissolving the Portland cement and/or the Portland cement clinker in N-containing salt solution to produce the aqueous solution comprising calcium salt; and (iii) treating the aqueous solution comprising calcium salt with the gaseous stream comprising carbon dioxide to form the composition comprising calcium carbonate. In some embodiments, there are provided methods to form the composition, comprising (i) calcining limestone in the kiln to produce the Portland cement and/or the Portland cement clinker and the gaseous stream comprising carbon dioxide, wherein the Portland cement and/or the Portland cement clinker comprises free lime; (ii) dissolving the Portland cement and/or the Portland cement clinker in N-containing salt solution to produce the aqueous solution comprising calcium salt; and (iii) treating the aqueous solution comprising calcium salt with the gaseous stream comprising carbon dioxide to form the composition comprising calcium carbonate.

It is to be understood that the $CO_2$ used in the methods and the systems herein may be from the same calcination process that is producing the cement and/or the cement clinker or may be from a different kiln producing $CO_2$, or a different process producing the $CO_2$, or any combination of these. In some embodiments, the $CO_2$ used in the methods and the systems herein is a combination of the $CO_2$ obtained from the kiln producing the cement and/or the cement clinker and the $CO_2$ produced from another kiln. The $CO_2$ can be from any of the sources available commercially.

In some embodiments of the aforementioned aspects and embodiments, the method further comprises adding one or more of iron oxide, aluminum oxide, quartz, clay mineral, or combination thereof to the kiln and calcining to produce the cement and/or the cement clinker. The clay mineral includes, but not limited to, clay, shale, natural or artificial pozzolan, granulated blast furnace slag, or combination thereof.

In some embodiments of the aforementioned aspects and embodiments, the cement and/or the cement clinker (such as e.g., the Portland cement and/or the Portland cement clinker) formed after the calcination of the limestone and the one or more of iron oxide, aluminum oxide, quartz, clay mineral, or combination thereof, comprises lime (e.g., free lime, bound lime, or combination thereof) and/or one or more components selected from the group consisting of calcium carbonate, silica, aluminate, sulfate, silicate, ferrite, alite, belite, amorphous phase, and combination thereof. It is to be understood that the lime may be present in the cement and/or the cement clinker as free lime and/or bound lime in forms such as calcium silicate such as, but not limited to, alite ($3CaO \cdot SiO_2$), belite ($2CaO \cdot SiO_2$), aluminate (e.g., tricalcium aluminate $3CaO \cdot Al_2O_3$), ferrite (e.g., tetracalcium alumino ferrite $4CaO \cdot Al_2O_3 \cdot Fe_2O_3$), and/or other forms such as e.g., calcium sulfate (e.g., gypsum or anhydrite).

In some embodiments, the one or more components in the cement and/or the cement clinker selected from the group consisting of calcium carbonate, silica, aluminate, sulfate, silicate, ferrite, alite, belite, amorphous phase, and combination thereof may remain or be formed as insoluble solid during the dissolution of the cement and/or the cement clinker in the processes described herein and as such may be carried though the processes or may be separated out and optionally later mixed with the composition, as described in detail herein.

In some embodiments of the aspects and embodiments described herein, the cement and/or the cement clinker illustrated in the figures and described herein is Portland cement and/or Portland cement clinker.

In one aspect, there are provided methods to form the composition, comprising (i) calcining the limestone in the kiln to produce the Portland cement and/or the Portland cement clinker and the gaseous stream comprising carbon dioxide; (ii) dissolving the Portland cement and/or the Portland cement clinker in the N-containing salt solution to produce the aqueous solution comprising calcium salt; and (iii) treating the aqueous solution comprising calcium salt with the gaseous stream comprising carbon dioxide to form the composition comprising calcium carbonate. In some embodiments of the aforementioned aspects and embodiments, the method further comprises adding one or more of iron oxide, aluminum oxide, quartz, clay mineral, or combination thereof to the kiln and producing the Portland cement and/or the Portland cement clinker. In some embodiments of the aforementioned aspects and embodiments, the Portland cement and/or the Portland cement clinker comprises lime, e.g., free lime and/or one or more components selected from the group consisting of calcium carbonate, silica, aluminate, sulfate, silicate, ferrite, alite, belite, amorphous phase, and combination thereof.

In some embodiments, typical components of the Portland cement include, but not limited to, calcium oxide (CaO or lime or free lime), silicate (e.g., $SiO_2$, $2CaO \cdot SiO_2$, $3CaO \cdot SiO_2$), aluminate (e.g., $Al_2O_3$, $3CaO \cdot Al_2O_3$), ferrite (e.g., $Fe_2O_3$, $4CaO \cdot Al_2O_3 \cdot Fe_2O_3$), sulfate (e.g., $SO_4$, $CaSO_4 \cdot 2H_2O$, $CaSO_4 \cdot 1/2H_2O$), alite, belite, and/or calcium sulfate (e.g., gypsum or anhydrite) etc., or combination thereof. In some embodiments, typical components of the Portland cement clinker include, but not limited to, calcium silicate such as alite ($3CaO \cdot SiO_2$), belite ($2CaO \cdot SiO_2$), aluminate (e.g., tricalcium aluminate $3CaO \cdot Al_2O_3$), and/or ferrite (e.g., tetracalcium alumino ferrite $4CaO \cdot Al_2O_3 \cdot Fe_2O_3$).

The calcination or the calcining is a thermal treatment process to bring about a thermal decomposition of the limestone and optionally one or more of iron oxide, aluminum oxide, quartz, clay mineral, or combination thereof. This step of the calcination of the limestone to form the cement and/or the cement clinker is illustrated in FIGS. 2-4 as a first step shown in dashed lines. It is to be understood that the limestone calcination is one of the processes to form the cement and/or the cement clinker and the cement and/or the cement clinker may be formed by any process known in the art. As such, the processes described herein are not limited to the limestone calcination process to form the cement and/or the cement clinker.

The "limestone" as used herein, includes $CaCO_3$ and may further include other impurities typically present in the limestone. Limestone is a naturally occurring mineral. The chemical composition of this mineral may vary from region to region as well as between different deposits in the same region. Therefore, the lime containing the calcium oxide and/or the calcium hydroxide obtained from calcining limestone from each natural deposit may be different. Typically, limestone may be composed of calcium carbonate ($CaCO_3$), magnesium carbonate ($MgCO_3$), silica ($SiO_2$), alumina ($Al_2O_3$), iron (Fe), sulfur (S) or other trace elements.

Limestone deposits are widely distributed. The limestone from the various deposits may differ in physical chemical properties and can be classified according to their chemical composition, texture, and geological formation. Limestone may be classified into the following types: high calcium limestone where the carbonate content may be composed mainly of calcium carbonate with a magnesium carbonate content not more than 5%; magnesium limestone containing magnesium carbonate to about 5-35%; or dolomitic limestone which may contain between 35-46% of $MgCO_3$, the balance amount is calcium carbonate. Limestones from different sources may differ considerably in chemical compositions and physical structures. It is to be understood that the methods and systems provided herein apply to all the cement plants calcining the limestone from any of the sources listed above or commercially available. The quarries include, but are not limited to, quarries associated with cement kilns, quarries for lime rock for aggregate for use in concrete, quarries for lime rock for other purposes (road base), and/or quarries associated with lime kilns.

The limestone calcination is a decomposition process where the chemical reaction for decomposition of the limestone is:

$$CaCO_3 \rightarrow CaO + CO_2(g)$$

When the limestone is calcined with one or more of iron oxide, aluminum oxide, quartz, clay mineral, or combination thereof, it may result in the formation of the cement and/or the cement clinker comprising lime and/or one or more components selected from the group consisting of calcium carbonate, silica, aluminate, sulfate, silicate, ferrite, alite, belite, amorphous phase, and combination thereof.

The "aluminate" as used herein, includes the aluminate (e.g., $Al_2O_3$) and/or the calcium aluminate (e.g., tricalcium aluminate $3CaO \cdot Al_2O_3$). The "sulfate" as used herein, includes the sulfate (e.g., $SO_4$) and/or the calcium sulfate (e.g., gypsum). The "silicate" as used herein, includes the silicate (e.g., $SiO_2$) and/or the calcium silicate (e.g., alite or belite). The "ferrite" as used herein, includes the ferrite (e.g., $Fe_2O_3$) and/or the calcium ferrite (e.g., tetracalcium alumino ferrite).

In some embodiments, the limestone comprises between about 1-70% magnesium and/or a magnesium bearing mineral is mixed with the limestone before the calcination wherein the magnesium bearing mineral comprises between about 1-70% magnesium. In some embodiments, the magnesium upon the calcination forms the magnesium oxide which may be precipitated and/or incorporated in the cement and/or the cement clinker and further in the composition comprising calcium carbonate cement once formed. In some embodiments, the magnesium bearing mineral comprises magnesium carbonate, magnesium salt, magnesium hydroxide, magnesium silicate, magnesium sulfate, or combination thereof. In some embodiments, the magnesium bearing mineral includes, but not limited to, dolomite, magnesite, brucite, carnallite, talc, olivine, artinite, hydromagnesite, dypingite, barringonite, nesquehonite, lansfordite, kieserite, and combination thereof. In some embodiments, the magnesium oxide in the composition comprising calcium carbonate when comes in contact with water, transforms to magnesium hydroxide which may bind with the transformed aragonite (transformation of the reactive vaterite to the aragonite as described herein) and/or calcite. The addition of magnesium oxide in the composition has been described in detail in U.S. Provisional Application No. 63/176,709, filed Apr. 19, 2021, which is incorporated herein by reference in its entirety.

The production of the cement and/or the cement clinker by calcining the limestone may be carried out using various types of kilns, such as, but not limited to, a shaft kiln or a rotary kiln or an electric kiln. The use of the electric kiln in the calcination and the advantages associated with it, have been described in U.S. application Ser. No. 17/363,537, filed Jun. 30, 2021, which is fully incorporated herein by reference in its entirety.

These apparatuses for the calcining are suitable for calcining the limestone in the form of lumps having diameters of several to tens millimeters. Cement plant waste streams include waste streams from both wet process and dry process plants, which plants may employ shaft kilns, rotary kilns, electric kilns, or combination thereof and may include pre-calciner. These industrial plants may each burn a single fuel or may burn two or more fuels sequentially or simultaneously.

The $CO_2$ emitted by the one or more kilns during the calcination process is recovered and transferred to the methods and systems provided herein, to be used for the precipitation of the composition comprising calcium carbonate.

In some embodiments of the methods and systems provided herein, the operation of the kiln is at a high lime saturation factor (LSF). Typically, the LSF is the ratio of the actual amount of the lime in raw meal/clinker to the theoretical lime required by the major oxides ($SiO_2$, $Al_2O_3$ and $Fe_2O_3$) in the raw mix or clinker. In some embodiments of the methods and systems provided herein, the LSF in the cement and/or the cement clinker is in a range of between about 0.92-1 or between about 0.92-0.98 or between about 0.95-0.98 or between about 0.95-1 or between about 0.98-1 or above 1 or between about 1-2 or between about 1-3 or between about 1-5 or between about 1-10 or above. In some embodiments of the methods and systems provided herein, the operation of the kiln is at the LSF of between about 0.98-1 or above 1. In some embodiments of the methods and systems provided herein, the operation of the kiln is at the LSF of above 1 to increase the amount of the free lime or extractable calcium. Applicants surprisingly found that running the kiln at higher than 1 LSF creates free lime which is extractable by the methods and systems described herein. Typically, the cement plants avoid producing the free lime and therefore run at lower LSF.

As illustrated in FIGS. 2-4, the cement and/or the cement clinker obtained from e.g., the calcination process is further subjected to the dissolution step A to produce the aqueous solution comprising calcium salt. The cement and/or the cement clinker may be in the form of a solid from dry kiln/cement processes and/or may be in the form of slurry in wet kiln/cement processes. In some embodiments, the cement and/or the cement clinker may be subjected to one or more processes before and/or during the dissolution process to improve solubility including, but not limited to, grinding, ball milling, or combination thereof. Applicants surprisingly and unexpectedly found that the surface of the cement and/or the cement clinker particles may become depleted in calcium and/or covered in a layer of hydration products that may inhibit the extraction of additional calcium from the core of the cement and/or the clinker particle. In some embodiments, the grinding or the ball milling removes the layer and exposes a fresh calcium rich surface which can be dissolved by the dissolution process. In some embodiments, the amount of the calcium in the solution increases due to the aforementioned grinding and/or ball milling. In some embodiments, there are provided methods to form the composition, comprising: (i) grinding and/or ball milling the cement and/or the cement clinker; (ii) dissolving the ground and/or the ball milled cement and/or the cement clinker in N-containing salt solution to produce the aqueous solution comprising calcium salt; and (iii) treating the aqueous solution comprising calcium salt with the gaseous stream comprising carbon dioxide to form the composition comprising calcium carbonate.

In some embodiments of the methods and systems provided herein, calcium sulfate may be added to the cement and/or the cement clinker during the calcining and/or the grinding or ball milling step.

The cement and/or the cement clinker may be sparingly soluble in water. In some embodiments of the methods and systems provided herein, the solubility of the cement and/or the cement clinker may be increased by processes that remove the surface layer of the cement and/or the cement clinker to expose fresh calcium rich surface and increase the solubility of the calcium in the solution. In the methods and systems provided herein, the cement and/or the cement clinker solubility may be increased by its treatment with solubilizers. In the methods and systems provided herein, the cement and/or the cement clinker is dissolved or solubilized with a solubilizer, such as a weak acid solution (step A in FIGS. 2-4) under one or more dissolution conditions to produce the aqueous solution comprising calcium salt. For illustration purposes only, the weak acid solution, e.g., N-containing salt solution is being illustrated in the figures as ammonium chloride ($NH_4Cl$) solution and the subsequent calcium salt is being illustrated as calcium chloride ($CaCl_2$)). Various examples of the N-containing salt have been provided herein and are all within the scope of the invention.

In some embodiments, the N-containing salt solution solubilizes or dissolves the calcium from the cement and/or the cement clinker and leaves the insoluble solid. The N-containing salt includes without limitation, N-containing inorganic salt, N-containing organic salt, or combination thereof.

The "N-containing inorganic salt" as used herein includes any inorganic salt with nitrogen in it. Examples of N-containing inorganic salt include, but not limited to, ammonium halide (halide is any halogen), ammonium acetate, ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride.

The "N-containing organic salt" as used herein includes any salt of an organic compound with nitrogen in it. Examples of N-containing organic compounds include, but not limited to, aliphatic amine, alicyclic amine, heterocyclic amine, and combination thereof.

The "aliphatic amine" as used herein includes any alkyl amine of formula $(R)_n$—$NH_{3-n}$ where n is an integer from 1-3, wherein R is independently between C1-C8 linear or branched and substituted or unsubstituted alkyl. An example of the corresponding halide salt (chloride salt, bromide salt, fluoride salt, or iodide salt) of the alkyl amine of formula $(R)_n$—$NH_{3-n}$ is $(R)_n$—$NH_{4-n}^+Cl^-$. In some embodiments, when R is substituted alkyl, the substituted alkyl is independently substituted with halogen, hydroxyl, acid and/or ester.

For example, when R is alkyl in $(R)_n$—$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$—$NH_{3-n}$, the substituted alkyl amine is an alkanolamine including, but not limited to, monoalkanolamine, dialkanolamine, or trialkanolamine, such as e.g., monoethanolamine, diethanolamine, or triethanolamine, etc.

For example, when R is substituted alkyl substituted with halogen in $(R)_n$—$NH_{3-n}$, the substituted alkyl amine is, for example, chloromethylamine, bromomethylamine, chloroethylamine, bromoethylamine, etc.

For example, when R is substituted alkyl substituted with acid in $(R)_n$—$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combination thereof. In some embodiments, the aforementioned amino acid has a charged alkyl chain, examples include without limitation, arginine, histidine, lysine, aspartic acid, glutamic acid, or combination thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is (R) Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In the methods and systems provided herein, the cement and/or the cement clinker is dissolved or solubilized with the N-containing salt solution (step A) under one or more dissolution conditions to produce the aqueous solution comprising calcium salt. The dissolution step may form ammonia in the aqueous solution (illustrated in FIG. 2) and/or form the gaseous stream comprising ammonia gas (illustrated in FIGS. 3 and 4). As illustrated in step A of FIGS. 2-4, the N-containing salt is exemplified as ammonium chloride ($NH_4Cl$). The cement and/or the cement clinker is solubilized by treatment with $NH_4Cl$ (new and recycled as further explained below) to form an aqueous solution comprising calcium salt, such as e.g., $CaCl_2$).

In some embodiments, the N-containing inorganic salt such as, but not limited to, an ammonium salt, e.g., ammonium chloride solution may be supplemented with anhydrous ammonia or an aqueous solution of ammonia to maintain an optimum level of ammonium salt, e.g., ammonium chloride in the solution.

In some embodiments, the aqueous solution comprising calcium salt further comprises the N-containing salt, such as, ammonia and/or N-containing inorganic or N-containing organic salt.

In some embodiments, the amount of the N-containing inorganic salt, the N-containing organic salt, or combination thereof, is in more than 20% excess or more than 30% excess to the cement. In some embodiments, the molar ratio of the N-containing salt:calcium oxide or free lime in the cement and/or the cement clinker (or the N-containing inorganic salt:calcium oxide or the free lime in the cement and/or the cement clinker, or the N-containing organic salt:calcium oxide or the free lime in the cement and/or the cement clinker, or the ammonium chloride:calcium oxide or the free lime in the cement and/or the cement clinker, or the ammonium acetate:calcium oxide or the free lime in the cement and/or the cement clinker) is between 3:1-1:1; or 2.5:1-1:1; or 2:1-1:1; or 0.5:1-2:1; or 0.5:1-1.5:1; or 1:1-1.5:1; or 1.5:1; or 3:1; or 2:1; or 2.5:1; or 1:1.

In some embodiments of the methods and systems described herein, one or more dissolution conditions are selected from the group consisting of temperature between about 10-200° C., or between about 10-150° C., or between about 10-100° C., or between about 10-75° C., or between about 10-50° C., or between about 10-25° C., or between about 30-200° C., or between about 30-150° C., or between about 30-100° C., or between about 30-75° C., or between about 30-50° C., or between about 40-200° C., or between about 40-150° C., or between about 40-100° C., or between about 40-75° C., or between about 40-50° C., or between about 50-200° C., or between about 50-150° C., or between about 50-100° C.;

pressure between about 0.1-50 atm, or between about 0.1-40 atm, or between about 0.1-30 atm, or between about 0.1-20 atm, or between about 0.1-10 atm, or between about 0.5-20 atm;

N-containing inorganic or organic salt wt % in water between about 0.5-50%, or between about 0.5-25%, or between about 0.5-10%, or between about 3-30%, or between about 5-20%;

or combination thereof.

Agitation may be used to affect dissolution of the cement and/or the cement clinker with the N-containing salt solution in the dissolution reactor, for example, by eliminating hot and cold spots. In some embodiments, the concentration of the cement and/or the cement clinker in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the dissolution/solvation of the cement and/or the cement clinker, high shear mixing, wet milling, and/or sonication may be used to break open the cement. During or after high shear mixing and/or wet milling, the cement and/or the cement clinker suspension may be treated with the N-containing salt solution.

In some embodiments, the dissolution of the cement and/or the cement clinker in the N-containing salt solution produces the aqueous solution comprising calcium salt and partially or completely insoluble solid obtained from the kiln feed components (either limestone and/or other components such as, e.g., one or more of iron oxide, aluminum oxide, quartz, clay mineral, or combination thereof) that did not react within the kiln; undissolved clinker phase; hydrate; amorphous phase; or combination thereof.

In some embodiments, the dissolution of the cement and/or the cement clinker comprising lime and/or one or more components selected from the group consisting of calcium carbonate, silica, aluminate, sulfate, silicate, ferrite, alite, belite, amorphous phase, and combination thereof, results in the formation of the aqueous solution comprising calcium salt further comprising one or more components selected from the group consisting of calcium carbonate, silica, aluminate, sulfate, silicate, ferrite, alite, belite, amorphous phase, and combination thereof. In some embodiments, these one or more components selected from the group consisting of calcium carbonate, silica, aluminate, sulfate, silicate, ferrite, alite, belite, amorphous phase, and combination thereof, fully or partially constitute the insoluble solid and/or a suspension.

In some embodiments, the foregoing insoluble solid comprises pozzolanic material or C—S—H (the silicate, such as e.g., calcium silicate hydrate) seed particle(s) which when stays in the aqueous solution and/or when is in the composition comprising the calcium carbonate, provides unique properties, including, but not limited to, nucleation sites (or seeding) for the formation of silicate hydrate, acceleration of hydration of the composition (e.g., when mixed with Portland cement), increased strength, increased durability, and/or reduced permeability. Applicants unexpectedly and surprisingly found that the use of the cement and/or the cement clinker, such as e.g., the Portland cement or the Portland cement clinker results in the formation of the C—S—H seed particle(s) in the aqueous solution due to the presence of the silicates in the cement and/or the cement clinker. In some embodiments, the C—S—H seed particle(s) not only accelerate the formation of the vaterite during the precipitation of the calcium carbonate but also facilitate transformation of the vaterite to the aragonite and/or the calcite during the dissolution and re-precipitation of the vaterite. In some embodiments, the C—S—H seed particle(s) affect the particle size of the composition comprising calcium carbonate (also described in the examples herein). Further, if the composition comprising calcium carbonate is mixed with the Portland cement to form blended composition (as described herein), the C—S—H seed particle(s) accelerate the hydration of the Portland cement by providing the seeding of the calcium silicate hydrates.

In some embodiments, when the composition comprising calcium carbonate is in the form of reactive vaterite, the foregoing insoluble solid provides heterogenous nucleation site(s), which increases the number of reactive vaterite crystals in the reactor. In the precipitation reactor, there may be a balance between the vaterite depositing on an existing vaterite crystal/agglomerate or nucleating a new reactive vaterite crystal. The heterogeneous nucleation sites may shift that balance to create more nucleation events and consequently less growth events, so the average particle size of the reactive vaterite particle may decrease.

In some embodiments, there are provided methods to form the composition comprising reactive vaterite cement, comprising: (i) dissolving the cement and/or the cement clinker in N-containing salt solution to produce the aqueous solution comprising calcium salt and the insoluble solid, wherein the insoluble solid comprises C—S—H seed particle(s); and (ii) treating the aqueous solution comprising calcium salt and the insoluble solid with the gaseous stream comprising carbon dioxide to form the composition comprising reactive vaterite cement and the insoluble solid, wherein the insoluble solid comprising C—S—H seed particle(s) provides nucleation sites to accelerate formation of the reactive vaterite cement and/or reduce the average particle size of the reactive vaterite cement. In some embodiments, there are provided methods to form the composition comprising aragonite cement, comprising: (i) dissolving the cement and/or the cement clinker in N-containing salt solution to produce the aqueous solution comprising calcium salt and the insoluble solid, wherein the insoluble solid comprises C—S—H seed particle(s); and (ii) treating the aqueous solution comprising calcium salt and the insoluble solid with the gaseous stream comprising carbon dioxide to form the composition comprising aragonite cement and the insoluble solid, wherein the insoluble solid comprising C—S—H seed particle(s) provides nucleation sites to accelerate formation of the aragonite cement and/or reduce the average particle size of the aragonite cement. In some embodiments, there are provided methods to form the composition comprising calcite cement, comprising: (i) dissolving the cement and/or the cement clinker in N-containing salt solution to produce the aqueous solution comprising calcium salt and the insoluble solid, wherein the insoluble solid comprises C—S—H seed particle(s); and (ii) treating the aqueous solution comprising calcium salt and the insoluble solid with the gaseous stream comprising carbon dioxide to form the composition comprising calcite cement and the insoluble solid, wherein the insoluble solid comprising C—S—H seed particle(s) provides nucleation sites to accelerate formation of the calcite cement and/or reduce the average particle size of the calcite cement. In some embodiments, the insoluble solid comprises one or more components selected from the group consisting of calcium carbonate, silica, aluminate, sulfate, silicate, ferrite, alite, belite, amorphous phase, and combination thereof.

In some embodiments of the aforementioned aspects and embodiments, the insoluble solid comprises C—S—H (calcium silicate hydrate) and optionally one or more components selected from the group consisting of calcium carbonate, silica, aluminate, sulfate, silicate, ferrite, alite, belite, amorphous phase, and combination thereof.

In some embodiments, the dissolution of the cement and/or the cement clinker with the N-containing salt solution (illustrated as e.g., ammonium chloride) results in the formation of the aqueous solution comprising calcium salt and the foregoing insoluble solid. In some embodiments, the solid or the insoluble solid may be removed from the aqueous solution of the calcium salt (step B in FIGS. 2-4) before the aqueous solution is treated with the carbon dioxide gas in the process. The insoluble solid may optionally be removed from the aqueous solution by filtration and/or centrifugation techniques. In some embodiments, the solid or the insoluble solid after separation and processing, may be mixed into the composition comprising calcium carbonate. In some embodiments, the insoluble solid after separation and processing may be stored and/or sold as is.

It is to be understood that the step B in FIGS. 2-4 is optional and in some embodiments, the insoluble solid comprising calcium carbonate, silica, aluminate, sulfate, silicate (e.g., C—S—H), ferrite, alite, belite, amorphous phase, or combination thereof, may not be removed from the aqueous solution (not shown in the figures) and the aqueous solution containing calcium salt as well as the insoluble solid is contacted with the carbon dioxide (in step C in FIGS. 2-4) to form the calcium carbonate precipitate. In such embodiments, the precipitation material or the composition comprising calcium carbonate further comprises insoluble solid. As described earlier, the presence of the insoluble solid in the aqueous solution provides the pozzolanic material and/or the C—S—H seed particle(s) or the nucleation sites that accelerate hydration of the cement composition, increased strength, increased durability, and/or reduced permeability.

In some embodiments, the insoluble solid obtained from the dissolution of the cement and/or the cement clinker (shown as insoluble solid in FIGS. 2-4), when not separated, is present in the aqueous solution, the composition cake, the dry composition comprising calcium carbonate, and finally, in the cement products.

Applicants unexpectedly and surprisingly found that the presence of the C—S—H (calcium silicate hydrate) seed particle(s) in the insoluble solid also benefit the hydration of the Portland cement when the composition comprising calcium carbonate is mixed with the Portland cement in a cement blend composition. In some embodiments, the C—S—H seed particle(s) act as seeds for the hydration of the di-calcium silicates and/or tri-calcium silicates in the Portland cement and accelerates hydration of the Portland cement in the blended composition.

In some embodiments, the insoluble solid is between about 1-85 wt %; or between about 1-80 wt %; or between about 1-75 wt %; or between about 1-70 wt %; or between about 1-60 wt %; or between about 1-50 wt %; or between about 1-40 wt %; or between about 1-30 wt %; or between about 1-20 wt %; or between about 1-10 wt % or between about 1-5 wt %; or between about 1-2 wt %, in the aqueous solution, in the composition cake, in the composition comprising calcium carbonate, or combinations thereof. In some embodiments, the insoluble solid is between about 1-85 wt %; or between about 1-80 wt %; or between about 1-75 wt %; or between about 1-70 wt %; or between about 1-60 wt %; or between about 1-50 wt %; or between about 1-40 wt %; or between about 1-30 wt %; or between about 1-20 wt %; or between about 1-10 wt % or between about 1-5 wt %; or between about 1-2 wt %, of dissolved cement mass. In some embodiments, the insoluble solid is between about 1-85 wt %; or between about 1-80 wt %; or between about 1-75 wt %; or between about 1-70 wt %; or between about 1-60 wt %; or between about 1-50 wt %; or between about 1-40 wt %; or between about 1-30 wt %; or between about 1-20 wt %; or between about 1-10 wt % or between about 1-5 wt %; or between about 1-2 wt % of total solid produced (the composition comprising calcium carbonate and insoluble solid).

As illustrated in step C in FIGS. 2-4, the aqueous solution comprising calcium salt (and optionally insoluble solid) and dissolved ammonia and/or the ammonium salt is contacted under one or more precipitation conditions with the gaseous stream comprising carbon dioxide (optionally recycled from the calcination step of the limestone calcination process to form the cement and/or the cement clinker), to form the composition comprising calcium carbonate, an example shown in the reaction below:

$$CaCl_2)(aq)+2NH_3(aq)+CO_2(g)+H_2O \rightarrow CaCO_3(s)+2NH_4Cl(aq)$$

The absorption of the $CO_2$ into the aqueous solution produces $CO_2$-charged water containing carbonic acid, a species in equilibrium with both bicarbonate and carbonate. The precipitation material is prepared under one or more precipitation conditions (as described herein) suitable to form the calcium carbonate in various polymorphic forms as described herein.

In one aspect, the ammonia formed in the dissolution step A may be partially or fully present in a gaseous form. This aspect is illustrated in FIGS. 3 and 4.

In one aspect, there are provided methods to form the composition by (i) dissolving the cement and/or the cement clinker in the N-containing salt solution to produce the aqueous solution comprising calcium salt, and the gaseous stream comprising ammonia; and (ii) treating the aqueous solution comprising calcium salt with the gaseous stream comprising carbon dioxide and the gaseous stream comprising ammonia to form the composition comprising calcium carbonate. In some embodiments of the aforementioned aspect, the method further comprises calcining the limestone to form the cement and/or the cement clinker and the gaseous stream of carbon dioxide, before the step (i). This aspect is illustrated in FIG. 3, wherein the gaseous stream comprising $CO_2$ from the calcination step and the gaseous stream comprising $NH_3$ from step A of the process is recirculated to the precipitation reactor (step C) for the formation of the composition comprising calcium carbonate. Remaining steps of FIG. 3 are identical to the steps of FIG. 2. It is to be understood that the processes of both FIG. 2 and FIG. 3 can also take place simultaneously such that the ammonia may be partially present in the aqueous solution and partially present in the gaseous stream.

An example of the reaction taking place in the treatment step in the aforementioned aspect may be shown as below:

$$CaCl_2)(aq)+2NH_3(g)+CO_2(g)+H_2O \rightarrow CaCO_3(s)+2NH_4Cl(aq)$$

In some embodiments of the aspects and embodiments provided herein, the gaseous stream comprising ammonia may have ammonia from an external source and/or is recovered and recirculated from step A of the process.

In some embodiments of the aspects and embodiments provided herein, wherein the gaseous stream comprises ammonia and/or the gaseous stream comprises carbon dioxide, no external source of carbon dioxide and/or ammonia is used, and the process is a closed loop process. Such closed loop process is being illustrated in the figures described herein.

In some embodiments, the dissolution of the cement and/or the cement clinker with some of the N-containing organic salt may not result in the formation of ammonia gas or the amount of ammonia gas formed may not be substantial. In embodiments where the ammonia gas is not formed or is not formed in substantial amounts, the methods and systems illustrated in FIG. 2 where the aqueous solution comprising calcium salt is treated with the carbon dioxide gas, are applicable. In such embodiments, the organic amine salt may remain in the aqueous solution in fully or partially dissolved state or may separate as an organic amine layer.

The N-containing organic salt or the N-containing organic compound remaining in the supernatant solution after the precipitation may be called residual N-containing organic salt or residual N-containing organic compound. Methods and systems have been described herein to recover the residual compounds from the precipitate as well as the supernatant solution.

In one aspect, the ammonia gas and the $CO_2$ gas may be recovered and cooled down in a cooling reactor before mixing the cooled solution with the aqueous solution comprising calcium salt. This aspect is illustrated in FIG. 4.

In one aspect, there are provided methods to form the composition by (i) dissolving the cement and/or the cement clinker in the aqueous N-containing inorganic salt solution to produce a first aqueous solution comprising calcium salt (optionally comprising insoluble solid), and the gaseous stream comprising ammonia; (ii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combination thereof; and (iii) treating the first aqueous solution comprising calcium salt with the second aqueous solution comprising ammonium bicarbonate, ammonium carbonate, ammonia, ammonia carbamate, or combination thereof to form the composition comprising calcium carbonate. In some embodiments of the aforementioned aspect, the method further comprises calcining the limestone to form the cement and the gaseous stream of carbon dioxide, before the step (i). It is to be understood that the aqueous solution comprising calcium salt and the first aqueous solution comprising calcium salt are the same and the terminology of the first aqueous solution is being used only to differentiate it from the second aqueous solution.

This aspect is illustrated in FIG. 4, wherein the gaseous stream comprising $CO_2$ from the calcination step and the gaseous stream comprising $NH_3$ from step A of the process is recirculated to the cooling reactor/reaction (step F) for the formation of the carbonate and bicarbonate solutions as shown in the reactions further herein below. Remaining steps of FIG. 4 are identical to the steps of FIGS. 2 and 3.

It is to be understood that the aforementioned aspect illustrated in FIG. 4 may be combined with the aspects illustrated in FIG. 2 and/or FIG. 3 such that the precipitation step C comprises treating the first aqueous solution comprising calcium salt with the second aqueous solution comprising ammonium bicarbonate, ammonium carbonate, ammonium carbamate, ammonia, or combination thereof (illustrated in FIG. 4), as well as comprises treating the aqueous solution comprising calcium salt with the gaseous stream comprising carbon dioxide (illustrated in FIG. 2) and/or comprises treating the aqueous solution comprising calcium salt with the gaseous stream comprising carbon dioxide and the gaseous stream comprising ammonia (illustrated in FIG. 3). In such embodiments, the gaseous stream comprising carbon dioxide may be split between the stream going to the cooling process and the stream going to the precipitation process. Similarly, in such embodiments, the gaseous stream comprising ammonia may be split between the stream going to the cooling process and the stream going to the precipitation process. Any combination of the processes depicted in FIGS. 2-4 is possible and all are within the scope of this disclosure.

The ammonium carbamate has a formula $NH_4[H_2NCO_2]$ consisting of ammonium ions $NH_4^+$, and carbamate ions $H_2NCO_2^-$.

The combination of these condensed products in the second aqueous solution may be dependent on the one or more of the cooling conditions. Table I presented below represents various combinations of the condensed products in the second aqueous solution.

TABLE I

| Ammonium carbonate | Ammonium bicarbonate | Ammonia | Ammonium carbamate |
|---|---|---|---|
| X | | | |
| | X | | |
| | | X | |
| | | | X |
| X | X | | |
| X | | X | |
| X | | | X |
| | X | X | |
| | X | | X |
| | | X | X |
| X | X | X | |
| X | X | | X |
| X | X | X | X |
| | X | X | X |

In some embodiments of the aforementioned aspects and embodiments, the gaseous stream (e.g., the gaseous streams going to the cooling reaction/reactor (step F in FIG. 4)) further comprises water vapor. In some embodiments of the aforementioned aspects and embodiments, the gaseous stream further comprises between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

Intermediate steps in the cooling reaction/reactor may include the formation of ammonium carbonate and/or ammonium bicarbonate and/or ammonium carbamate, by reactions as below:

$$2NH_3+CO_2+H_2O \rightarrow (NH_4)_2CO_3$$

$$NH_3+CO_2+H_2O \rightarrow (NH_4)HCO_3$$

$$2NH_3+CO_2 \rightarrow (NH_4)NH_2CO_2$$

Similar reactions may be shown for the N-containing organic salt:

$$2NH_2R+CO_2+H_2O \rightarrow (NH_3R)_2CO_3$$

$$NH_2R+CO_2+H_2O \rightarrow (NH_3R)HCO_3$$

An advantage of cooling the ammonia in the cooling reaction/reactor is that ammonia may have a limited vapor pressure in the vapor phase of the dissolution reaction. By reacting the ammonia with $CO_2$, as shown in the reactions above, can remove some ammonia from the vapor space, allowing more ammonia to leave the dissolution solution.

The second aqueous solution comprising ammonium bicarbonate, ammonium carbonate, ammonia, ammonium carbamate, or combination thereof (exiting the cooling reaction/reactor in FIG. 4) is then treated with the first aqueous solution comprising calcium salt (optionally comprising insoluble solid) from the dissolution reaction/reactor, in the precipitation reaction/reactor (step C) to form the precipitation material or the composition comprising calcium carbonate (an example shown with $CaCl_2$):

$$(NH_4)_2CO_3+CaCl_2 \rightarrow CaCO_3+2NH_4Cl$$

$$(NH_4)HCO_3+NH_3+CaCl_2 \rightarrow CaCO_3+2NH_4Cl+H_2O$$

$$2(NH_4)HCO_3+CaCl_2 \rightarrow CaCO_3+2NH_4Cl+H_2O+CO_2$$

$$(NH_4)NH_2CO_2+H_2O+CaCl_2 \rightarrow CaCO_3+2\ NH_4Cl$$

In some embodiments of the aspects and embodiments provided herein, the one or more cooling conditions comprise temperature between about 0-200° C., or between about 0-150° C., or between about 0-75° C., or between about 0-100° C., or between about 0-80° C., or between about 0-60° C., or between about 0-50° C., or between about 0-40° C., or between about 0-30° C., or between about 0-20° C., or between about 0-10° C.

In some embodiments of the aspects and embodiments provided herein, the one or more cooling conditions comprise pressure between about 0.5-50 atm; or between about 0.5-25 atm; or between about 0.5-10 atm; or between about 0.1-10 atm; or between about 0.5-1.5 atm; or between about 0.3-3 atm.

In some embodiments, the formation and the quality of the calcium carbonate formed in the methods and systems provided herein, is dependent on the amount and/or the ratio of the condensed products in the second aqueous solution comprising ammonium bicarbonate, ammonium carbonate, ammonia, ammonium carbamate, or combination thereof.

In some embodiments, the presence or absence or distribution of the condensed products in the second aqueous solution comprising ammonium bicarbonate, ammonium carbonate, ammonia, ammonium carbamate, or combination thereof, can be optimized in order to maximize the formation of the calcium carbonate and/or to obtain a desired particle size distribution. This optimization can be based on the one or more cooling conditions, such as, pH of the aqueous solution in the cooling reactor, flow rate of the $CO_2$ and the $NH_3$ gases, and/or ratio of the $CO_2$:$NH_3$ gases. The inlets for the cooling reactor may be carbon dioxide ($CO_{2(g)}$), the dissolution reactor gas exhaust containing ammonia ($NH_{3(g)}$), water vapor, and optionally fresh makeup water (or some other dilute water stream). The outlet may be a slipstream of the reactor's recirculating fluid (the second aqueous solution), which is directed to the precipitation reactor for contacting with the first aqueous solution and optionally additional carbon dioxide and/or ammonia. The pH of the system may be controlled by regulating the flow rate of $CO_2$ and $NH_3$ into the cooling reactor. The conductivity of the system may be controlled by addition of dilute makeup water to the cooling reactor. Volume may be maintained constant by using a level detector in the cooling reactor or it's reservoir.

It is to be understood that while FIG. 4 illustrates a separate cooling reaction/reactor, in some embodiments, the dissolution reaction/reactor may be integrated with the cooling reaction/reactor. For example, the dissolution reactor may be integrated with a condenser acting as a cooling reactor. Various configurations of the integrated reactor described above, are described in U.S. application Ser. No. 17/184,933, filed Feb. 25, 2021, which is incorporated herein by reference in its entirety.

In the aforementioned aspects, both the dissolution and the cooling reactors are fitted with inlets and outlets to receive the required gases and collect the aqueous streams. In some embodiments of the aforementioned aspect, the dissolution reactor comprises a stirrer to mix the cement and/or the cement clinker with the aqueous N-containing salt solution. The stirrer can also facilitate upward movement of the gases. In some embodiments of the aforementioned aspect, the dissolution reactor is configured to collect the insoluble solid settled at the bottom of the reactor after removing the aqueous solution comprising calcium salt. In some embodiments of the aforementioned aspect, the cooling tower comprises one or more trays configured to catch and collect the condensed second aqueous solution and prevent it from falling back into the dissolution reactor. As such, the cooling/condensation may be accomplished through use of infusers, bubblers, fluidic Venturi reactors, spargers, gas filters, sprays, trays, or packed column reactors, and the like.

In some embodiments, the contacting of the aqueous solution comprising calcium salt with carbon dioxide and optionally ammonia or second aqueous solution is achieved by contacting the aqueous solution to achieve and maintain a desired pH range, a desired temperature range, and/or desired divalent cation concentration using a convenient protocol as described herein (precipitation conditions). In some embodiments, the systems include a precipitation reactor configured to contact the aqueous solution comprising calcium salt (optionally comprising insoluble solid) with carbon dioxide and optionally ammonia from step A of the process or the systems include a precipitation reactor configured to contact the first aqueous solution comprising calcium salt (optionally comprising insoluble solid) with the second aqueous solution comprising ammonium bicarbonate, ammonium carbonate, ammonia, ammonium carbamate, or combination thereof.

In some embodiments, the aqueous solution comprising calcium salt (optionally comprising insoluble solid) may be placed in a precipitation reactor, wherein the amount of the aqueous solution comprising calcium salt added is sufficient to raise the pH to a desired level (e.g., a pH that induces precipitation of the precipitation material) such as pH 7-12, pH 7-12, pH 7-10, pH 7-9, pH 7-8.7, pH 7-8.5, pH 7-8, pH 7.5-8, pH 8-8.5, pH 8.5-9, pH 9-14, pH 10-14, pH 11-14, pH 12-14, or pH 13-14. In some embodiments, the pH of the aqueous solution comprising calcium salt (optionally comprising insoluble solid) when contacted with the carbon dioxide and optionally the $NH_3$ or the second aqueous solution, is maintained at between 7-12 or between 7-9 or between 7-8.7 or between 7-8.5 or between 7.5-8.5 or between 7-8, or between 7.6-8.5, or between 8-8.5, or between 7.5-9.5 in order to form the calcium carbonate.

The aqueous solution comprising calcium salt (optionally comprising insoluble solid) may be contacted with the gaseous stream comprising the $CO_2$ and optionally the $NH_3$ using any convenient protocol. The contact protocols of interest include, but not limited to, direct contacting protocols (e.g., bubbling the gases through the first aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the gases and the liquid sheet move in countercurrent, co-current, or crosscurrent directions, or in any other suitable manner. In some embodiments, gas-liquid contact is accomplished by contacting liquid droplets of the solution having an average diameter of 500 micrometers or less, such as 100 micrometers or less, with the gas source.

Any number of the gas-liquid contacting protocols described herein may be utilized. Gas-liquid contact or the liquid-liquid contact is continued until the pH of the precipitation reaction mixture is optimum (various optimum pH values have been described herein to form the precipitation material or the composition comprising calcium carbonate), after which the precipitation reaction mixture is allowed to stir. The rate at which the pH drops may be controlled by addition of more of the aqueous solution comprising calcium salt (optionally comprising insoluble solid) during gas-liquid contact or the liquid-liquid contact. In addition, additional aqueous solution may be added after sparging to raise the pH back to basic levels for precipitation of a portion or all the precipitation material. In any case, the precipitation material may be formed upon removing protons from certain species in the precipitation reaction mixture. The precipitation material comprising carbonates may then be separated and optionally, further processed.

The one or more precipitation conditions include those that modulate the environment of the precipitation reaction mixture to produce the desired polymorphic form of the calcium carbonate. Such one or more precipitation conditions include, but not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the reactive vaterite may also depend on the one or more precipitation conditions including presence or absence of the insoluble solid in the precipitation of the precipitation material.

For example, the temperature of the precipitation reaction may be raised to a point at which an amount suitable for precipitation of the desired precipitation material occurs. In such embodiments, the temperature of the precipitation reaction may be raised to a value, such as from 20° C. to 60° C., and including from 25° C. to 60° C.; or from 30° C. to 60° C.; or from 35° C. to 60° C.; or from 40° C. to 60° C.; or from 50° C. to 60° C.; or from 25° C. to 50° C.; or from 30° C. to 50° C.; or from 35° C. to 50° C.; or from 40° C. to 50° C.; or from 25° C. to 40° C.; or from 30° C. to 40° C.; or from 25° C. to 30° C. In some embodiments, the temperature of the precipitation reaction may be raised using energy generated from low or zero carbon dioxide emission sources (e.g., solar energy source, wind energy source, hydroelectric energy source, waste heat from the flue gases of the carbon emitter, etc).

The pH of the precipitation reaction may also be raised to an amount suitable for the precipitation of the desired precipitation material. In such embodiments, the pH of the precipitation reaction may be raised to alkaline levels for precipitation. In some embodiments, the precipitation conditions required to form the precipitation material include pH higher than 7 or pH of 8 or pH of between 7.1-8.5 or pH of between 7.5-8 or between 7.5-8.5 or between 8-8.5 or between 8-9 or between 7.6-8.4, in order to form the precipitation material. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}$:$Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}$:$Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

In some embodiments, the one or more precipitation conditions to produce the desired precipitation material from the precipitation reaction may include, as above, the temperature and pH, as well as, in some instances, the concentrations of additives and ionic species in the water. The additives have been described herein below. The presence of the additives and the concentration of the additives may also favor formation of vaterite, aragonite, calcite or amorphous phase of the calcium carbonate. In some embodiments, a middle chain or long chain fatty acid ester may be added to the aqueous solution or the first aqueous solution during the precipitation to form the calcium carbonate in the form of PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the precipitation step of the process.

In some embodiments, the gas leaving the precipitation reactor (shown as "scrubbed gas" in the figures) passes to a gas treatment unit for a scrubbing process. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

$$NH_3(g)+HCl(aq)\rightarrow NH_4Cl(aq)$$

The $NH_4Cl$ (aq) from the HCl scrubber may be recycled to the dissolution step A.

In some embodiments, the gas exhaust stream comprising ammonia (shown as "scrubbed gas" in the figures) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_{2(g)}$), the reactor gas exhaust containing ammonia ($NH_{3(g)}$), and fresh makeup water (or some other dilute water stream). The outlet may be a slipstream of the scrubber's recirculating fluid (e.g. $H_3N—CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber.

In some embodiments, the methods and systems provided herein further include separating the precipitation material (step D in FIGS. 2-4) from the aqueous solution by dewatering to form the composition cake or wet form or slurry form of the composition comprising calcium carbonate (optionally further comprising insoluble solid). The cake form of the composition comprising calcium carbonate may be subjected optionally to rinsing, and optionally drying (step E in FIGS. 2-4). The dried composition comprising calcium carbonate or the composition powder comprising calcium carbonate may then be used to make cementitious products (shown as products in FIGS. 2-4). In some embodiments, the cake may not be dried and may be used as is to form cementitious products (shown as products in FIGS. 2-4).

The methods and systems provided herein may result in residual N-containing salt such as the residual N-containing inorganic or N-containing organic salt, e.g., residual ammonium salt remaining in the supernatant solution as well as in the precipitate itself after the formation of the precipitate. The residual N-containing salt such as the N-containing inorganic or N-containing organic salt, e.g., residual ammonium salt (e.g., residual $NH_4Cl$) as used herein includes any salt that may be formed by ammonium ions and anions present in the solution including, but not limited to halogen ions such as chloride ions, acetate ions, nitrate or nitrite ions, and sulfur ions such as, sulfate ions, sulfite ions, thiosulfate ions, hydrosulfide ions, and the like. In some embodiments, the residual N-containing inorganic salt comprises ammonium halide, ammonium acetate, ammonium sulfate, ammonium sulfite, ammonium hydrosulfide, ammonium thiosulfate, ammonium nitrate, ammonium nitrite, or combination thereof. These residual salts may be removed and optionally recovered from the supernatant solution as well as the precipitate. In some embodiments, the supernatant solution further comprising the N-containing inorganic or N-containing organic salt, e.g., residual ammonium salt (e.g., residual $NH_4Cl$), is recycled back to the dissolution reactor for the dissolution of the cement and/or the cement clinker (to step A in FIGS. 2-4).

In some embodiments of the aspects and embodiments provided herein, the separated insoluble solid further comprises N-containing inorganic salt, such as, e.g., residual ammonium halide. In some embodiments of the aspects and embodiments, the process further comprises recovering the residual ammonium halide from the insoluble solid using a recovery process selected from the group consisting of rinsing, thermal decomposition, pH adjustment, and combination thereof.

In some embodiments of the aspects and embodiments provided herein, the process further comprises removing and optionally recovering ammonia and/or N-containing inorganic salt from the residual N-containing inorganic salt comprising removing and optionally recovering the residual N-containing inorganic salt from the supernatant aqueous solution and/or removing and optionally recovering the residual N-containing inorganic salt from the precipitate or the composition comprising calcium carbonate.

In some embodiments of the aspects and embodiments provided herein, the process further comprises recovering the residual N-containing inorganic salt from the supernatant aqueous solution using recovery process selected from the group consisting of thermal decomposition, pH adjustment, reverse osmosis, multi-stage flash distillation, multi-effect distillation, vapor recompression, distillation, and combination thereof.

In some embodiments of the aspects and embodiments provided herein, the step of removing and optionally recovering the residual N-containing inorganic salt from the composition comprising calcium carbonate comprises heating the composition between about 80-380° C. or between about 100-360° C. or between about 150-360° C. or between about 200-360° C. or between about 250-360° C. or between about 300-360° C. or between about 150-200° C. or between about 100-200° C. or between about 200-300° C. to evaporate the N-containing inorganic salt from the precipitate with optional recovery by condensation of the N-containing inorganic salt. In some embodiments of the foregoing aspect and embodiments, the N-containing inorganic salt is ammonium chloride which evaporates from the reactive vaterite cement precipitate in a form comprising ammonia gas, hydrogen chloride gas, chlorine gas, or combination thereof.

Applicants surprisingly found that in the step of removing and recovering the ammonia gas (in order to remove the residual N-containing salt) from the composition by heating the composition in a thermal decomposer to the temperature of between about 80-380° C., the ammonia gas may need to be swept out (optionally to a scrubber) in order to efficiently remove the residual N-containing salt. For example, if the atmospheric air is used as a sweep gas through the thermal decomposer to keep the ammonia concentration to below lower explosive limit (LEL) limits, Applicants found that the ammonia gas may come into contact with the high amount of the oxygen present in the atmospheric air and can potentially cause a flammability risk. Applicants recognized that the usage of a lower oxygen concentration flue gas can be efficiently used to sweep the thermal decomposer thus reducing the potential for any combustion event with ammonia. In some embodiments, the usage of the low oxygen concentration flue gas can keep the oxygen concentration in the thermal decomposer below the minimum oxygen ignition concentration of below about 10.5% by volume or below about 5% by volume and the ammonia below about 12.5% by volume or below about 10% by volume. Applicants discovered that a slipstream of the calcination kiln exhaust flue gas (same flue gas also used for capturing the $CO_2$ in the precipitation reaction) which has a low oxygen content (e.g., below about 15% by volume or below about 12% by volume or below about 10% by volume), can be used as the sweep gas in the thermal decomposer. In some embodiments, the heat from the kiln exhaust flue gas can be additionally used to act as a pre-heating element for the composition and/or decrease the temperature loss of the thermal decomposer unit caused by using ambient air as a sweep gas, thereby saving energy cost and increase efficiency.

In one aspect, there is provided a method to form the composition, comprising (i) calcining the limestone in the kiln to produce the cement and/or the cement clinker and the gaseous stream comprising carbon dioxide gas and oxygen gas; (ii) dissolving the cement and/or the cement clinker in the N-containing salt solution to produce the aqueous solution comprising calcium salt; (iii) treating the aqueous solution comprising calcium salt with the gaseous stream comprising carbon dioxide gas and oxygen gas to form the composition comprising calcium carbonate and residual N-containing salt; (iv) heating the composition comprising calcium carbonate and residual N-containing salt to form ammonia gas; and (v) passing a slipstream of the gaseous stream comprising carbon dioxide gas and oxygen gas over the heated composition to sweep the ammonia gas.

In some embodiments of the foregoing aspect, the gaseous stream comprising carbon dioxide gas and oxygen gas is the kiln exhaust gaseous stream. In some embodiments of the foregoing aspect and embodiments, the gaseous stream comprises carbon dioxide gas and less than about 15% oxygen gas by volume or less than about 12% oxygen gas by volume or less than about 10% oxygen gas by volume. In some embodiments of the foregoing aspect and embodiments, the composition is heated to between about 80-380° C.; or between about 80-300° C. In some embodiments of the foregoing aspect and embodiments, the slipstream of the gaseous stream comprising carbon dioxide gas and oxygen gas also provides heat to the thermal decomposer or to the composition comprising calcium carbonate and residual N-containing salt. In some embodiments of the foregoing aspect and embodiments, the sweep with the slipstream of the gaseous stream keeps the ammonia concentration below about 10% by volume or below about 5% by volume or below about 3.25% by volume. In some embodiments of the foregoing aspect and embodiments, the method further comprises passing the swept ammonia gas to the scrubber to scrub the ammonia gas with an acid, e.g., hydrochloric acid, sulfuric acid, or the like to form ammonium chloride, ammonium sulfate etc. In some embodiments of the foregoing aspect, the method further comprises forming the gaseous stream comprising ammonia in step (ii) dissolving step; and treating the aqueous solution comprising calcium salt with the gaseous stream comprising carbon dioxide and oxygen gas and the gaseous stream comprising ammonia to form the composition comprising calcium carbonate and residual N-containing salt.

In some embodiments of the foregoing aspect and embodiments, the method further comprises

- forming the gaseous stream comprising ammonia in step (ii) dissolving step;
- recovering the gaseous stream comprising carbon dioxide and oxygen gas from step (i) of the calcination and the gaseous stream comprising ammonia from step (ii) dissolving step and subjecting the gaseous streams to a cooling process to condense the aqueous solution comprising ammonium bicarbonate, ammonium carbonate, ammonia, ammonia carbamate, or combination thereof; and
- treating the aqueous solution comprising calcium salt with the aqueous solution comprising ammonium bicarbonate, ammonium carbonate, ammonia, ammonia carbamate, or combination thereof to form the composition comprising calcium carbonate and residual N-containing salt;
- heating the composition comprising calcium carbonate and residual N-containing salt to form ammonia gas; and
- passing the slipstream of the gaseous stream comprising carbon dioxide gas and oxygen gas over the heated composition to sweep the ammonia gas.

In some embodiments of the foregoing aspect and embodiments, the method further comprises passing the swept ammonia gas to the cooling process or the cooling reactor to condense the ammonia gas and the carbon dioxide gas to the aqueous solution comprising ammonium bicarbonate, ammonium carbonate, ammonia, ammonia carbamate, or combination thereof.

In the systems provided herein, the system further comprises the thermal decomposer operably connected to the dryer (or the thermal decomposer and the dryer are one unit) as well as the calcination unit and configured to heat the composition comprising calcium carbonate and residual N-containing salt to form the ammonia gas and pass the slipstream of the gaseous stream comprising carbon dioxide gas and oxygen gas over the heated composition to sweep the ammonia gas. In some embodiments, the thermal decomposer has the heating elements, thermal controls, inlets and outlets designed to carry out the heating as well as the sweeping functions.

In some embodiments of the aspects and embodiments provided herein, the process further comprises recycling the recovered residual ammonia and/or N-containing inorganic salt back to the treating and/or contacting step of the process.

The cake of the composition comprising calcium carbonate may be sent to the dryer (step E in FIGS. 2-4) to form dry powder composition (optionally further comprising insoluble solid). The powder form of the composition comprising calcium carbonate may be used further in applications to form products, as described herein. The cake may be dried using any drying techniques known in the art such as, but not limited to fluid bed dryer or swirl fluidizer. The resulting solid powder may be used as is or maybe then mixed with other components, such as, e.g., aluminosilicate material, limestone, Portland cement clinker, admixture, accelerator, additive, reinforcing fiber, or mixture thereof to make different products described herein. In some embodiments, the slurry form with reduced water or the cake form of the composition comprising calcium carbonate is directly used to form products, as described herein.

In some embodiments, the resultant dewatered cake obtained from the separation station is dried at the drying station to produce a powder form of the composition comprising calcium carbonate (optionally further comprising insoluble solid). Drying may be achieved by air-drying the cake. In certain embodiments, drying is achieved by freeze-drying (i.e., lyophilization), wherein the cake is frozen, the surrounding pressure is reduced, and enough heat is added to allow the frozen water in the cake to sublime directly into gas. In yet another embodiment, the cake is spray-dried to dry the cake, wherein the liquid containing the cake is dried by feeding it through a hot gas, and wherein the liquid feed is pumped through an atomizer into a main drying chamber and a hot gas is passed as a co-current or counter-current to the atomizer direction. Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate.

In some embodiments, the composition comprising calcium carbonate, wherein the calcium carbonate is in the form of reactive vaterite, the reactive vaterite (optionally further comprising insoluble solid) undergoes transformation to the aragonite and/or the calcite and sets and hardens into cementitious products (shown as products in FIGS. 2-4). In some embodiments, the insoluble solid (the insoluble solid has been described herein) may get incorporated in the cementitious products. This provides an additional advantage of one less step of removal of the insoluble solid, minimizing the loss of the N-containing salt, such as e.g., $NH_4Cl$ loss as well as eliminating a potential waste stream thereby increasing the efficiency and improving the economics of the process. In some embodiments, the insoluble solid does not adversely affect the transformation and/or reactivity of the vaterite but in fact enhances the acceleration of the hydration of the cement. In some embodiments, the insoluble solid does not adversely affect the strength (such as compressive strength or flexural strength) of the cementitious products.

In the systems provided herein, the separation or dewatering step D may be carried out on the separation station. The cake or the composition comprising calcium carbonate may be stored in the supernatant for a period of time following precipitation and prior to separation. For example, the composition comprising calcium carbonate may be stored in the supernatant for a period of time ranging from few min to hours to 1 to 1000 days or longer, such as 1 to 10 days or longer, at a temperature ranging from 1° C. to 40° C., such as 20° C. to 25° C. Separation or dewatering may be achieved using any of a number of convenient approaches, including draining (e.g., gravitational sedimentation of the precipitate comprising reactive vaterite cement followed by draining), decanting, filtering (e.g., gravity filtration, vacuum filtration, filtration using forced air), centrifuging, pressing, or any combination thereof. Separation of the bulk water from the composition comprising calcium carbonate produces a wet cake of the composition, or a dewatered composition. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the composition.

In some embodiments, the resultant dewatered composition comprising calcium carbonate such as the wet cake material (optionally further comprising insoluble solid) may be directly used to make the products described herein. For example, the wet cake of the composition comprising reactive vaterite is mixed with aluminosilicate material, Portland cement clinker, limestone, gypsum, and/or alkali metal accelerator, as described herein, and is spread out on the conveyer belt where the reactive vaterite transforms to the aragonite and/or the calcite and sets and hardens. The hardened material is then cut into desired shapes such as boards or panels described herein. In some embodiments, the wet cake is poured onto a sheet of paper on top of the conveyer belt. Another sheet of paper may be put on top of the wet cake which is then pressed to remove excess water. After the setting and hardening of the reactive vaterite (the vaterite transformation to the aragonite and/or the calcite), the material is cut into desired shapes, such as, cement siding boards and drywall etc. In some embodiments, the amount of the aluminosilicate material, Portland cement clinker, limestone, gypsum, and/or alkali metal accelerator or other materials or components described herein, may be optimized depending on the desired time required for the transformation of the vaterite to the aragonite and/or the calcite. For example, for some applications, it may be desired that the composition transforms rapidly and in certain other instance, a slow transformation may be desired. In some embodiments, the wet cake may be heated on the conveyer belt to hasten the transformation of the vaterite to the aragonite and/or the calcite. In some embodiments, the wet cake may be poured in the molds of desired shape and the molds are then heated in the autoclave to hasten the transformation of the vaterite to the aragonite and/or the calcite. Accordingly, the continuous flow process, batch process or semi-batch process, all are well within the scope of the invention.

In some embodiments, the composition comprising calcium carbonate (optionally further comprising insoluble solid), once separated may be washed with fresh water, and then placed into a filter press to produce a filter cake with 10-85 wt % solid. This filter cake may be then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate.

In processes involving the use of temperature and pressure, the dewatered cake may be dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results.

Several different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g., 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cure, e.g., by placing outside and storing, by placing in a chamber wherein they are subjected to high levels of humidity and heat, etc. These hard tablets, optionally cured, are then used as building materials themselves or crushed to produce aggregate.

The methods and systems provided herein produce or isolate the composition comprising calcium carbonate (optionally further comprising insoluble solid) in a wet form, slurry form, or a dry powder form. In some embodiments, the composition containing reactive vaterite transforms to the aragonite and/or the calcite form upon dissolution-reprecipitation, setting and hardening. The aragonite form may fully or partially convert further to more stable calcite form. The product from the composition containing calcium carbonate shows one or more unexpected properties, including but not limited to, high compressive strength, high porosity (low density or light weight), neutral or near neutral pH (useful as artificial reef described below), microstructure network, etc.

The polymorph forms of calcium carbonate that may be present in the composition comprising calcium carbonate include, but not limited to, vaterite, amorphous calcium carbonate, aragonite, calcite, a precursor phase of vaterite, a precursor phase of aragonite, an intermediary phase that is less stable than calcite, polymorphic forms in between these polymorphs or combination thereof.

Vaterite may be present in the reactive vaterite form or the stable vaterite form. The "reactive vaterite" or "reactive vaterite cement" as used herein, includes vaterite material that transforms to aragonite and/or calcite forms during and/or after dissolution-re-precipitation process in water and sets and hardens into a cement. The "stable vaterite" as used herein, includes vaterite material that does not transform to aragonite and/or calcite forms. In some embodiments, the stable vaterite may be used as a filler or as the SCM in cementitious compositions.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition, may be needle shaped, columnar, or crystals of the rhombic system. Calcite, if present in the composition, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The transformation between the polymorphs may occur via solid-state transition, may be solution mediated, or both. In some embodiments, the transformation is solution-mediated as it may require less energy than the thermally activated solid-state transition. Reactive vaterite is metastable and the difference in thermodynamic stability of calcium carbonate polymorphs may be manifested as a difference in solubility, where the least stable phases are the most soluble. Applicants have unexpectedly found that the reactive vaterite is more than two times soluble in water than limestone thereby increasing the kinetics of the cementation process. Therefore, the reactive vaterite may dissolve readily in solution and transform favorably towards a more stable polymorph, such as the aragonite and/or the calcite. In a polymorphic system like calcium carbonate, two kinetic processes may exist simultaneously in solution: dissolution of the metastable phase and growth of the stable phase. In some embodiments, the aragonite and/or the calcite crystals may be growing while the reactive vaterite is undergoing dissolution in the aqueous medium.

In one aspect, the reactive vaterite may be activated such that the reactive vaterite leads to aragonitic pathway and not calcite pathway during dissolution-re-precipitation process. In some embodiments, the reactive vaterite containing composition is activated in such a way that after the dissolution-re-precipitation process, the aragonite formation is enhanced, and the calcite formation is suppressed. The activation of the reactive vaterite containing composition may result in control over the aragonite formation and crystal growth. The activation of the vaterite containing composition may be achieved by various processes. Various examples of the activation of the reactive vaterite, such as, but not limited to, nuclei activation, thermal activation, mechanical activation, chemical activation, or combination thereof, are described herein. In some embodiments, the reactive vaterite is activated through various processes such that the aragonite and/or the calcite formation and its morphology and/or crystal growth can be controlled upon reaction of the reactive vaterite containing composition with water. The aragonite and/or the calcite formed results in higher tensile strength and fracture tolerance to the products formed from the reactive vaterite.

In some embodiments, the reactive vaterite may be activated by mechanical means, as described herein. For example, the reactive vaterite containing compositions may be activated by creating surface defects on the vaterite composition such that the aragonite formation is accelerated. In some embodiments, the activated vaterite is a ball-milled reactive vaterite or is a reactive vaterite with surface defects such that aragonite and/or calcite formation pathway is facilitated.

The composition comprising calcium carbonate may also be activated by providing chemical or nuclei activation to the composition. Such chemical or nuclei activation may be provided by one or more of seeds, inorganic additive, or organic additive. The aragonite seed present in the compositions provided herein, e.g., may be obtained from natural or synthetic sources. The natural sources include, but not limited to, reef sand, lime, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of the reactive vaterite to aragonite, such as transformed reactive vaterite described herein.

In some embodiments, the inorganic additive or the organic additive in the compositions provided herein can be any additive that activates the composition comprising calcium carbonate. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

Without being limited by any theory, it is contemplated that the activation of the composition by ball-milling or by addition of seed, inorganic additive or organic additive or combination thereof may result in control of formation of the vaterite, aragonite and/or the calcite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of the aragonite that may generally not be favorable kinetically.

In some embodiments, in the foregoing methods, the amount of the one or more additives added during the process is more than 0.1% by weight, or more than 0.5% by weight, or more than 1% by weight, or more than 2% by weight, or more than 3% by weight, or more than 4% by weight, or between 0.5-3% by weight or between 1.5-2.5% by weight.

In some embodiments, the composition comprising calcium carbonate upon combination with water, setting, and hardening, have a compressive strength of at least 3 MPa (megapascal), or at least 7 MPa, or at least 10 MPa or in some embodiments, between 3-30 MPa, or between 14-80 MPa or 14-35 MPa.

In the aspects provided herein, the methods comprise blending the composition comprising calcium carbonate (optionally further comprising insoluble solid) with the SCM comprising aluminosilicate material. The aluminosilicate materials include, without limitation, heat-treated clay or shale, natural or artificial pozzolan, granulated blast furnace slag, or combinations thereof. In some embodiments, the methods further comprise heating the clay material at a temperature between 500-1100° C. to produce the heat-treated clay material before its blending with the composition comprising calcium carbonate. In some embodiments, the heat-treated clay material may be ground before the blending.

In some embodiments, the methods further comprise mixing or blending the carbonate material with the aluminosilicate material before the blending with the composition comprising calcium carbonate. It is to be understood that the carbonate material, such as e.g., limestone may be mixed with the composition comprising calcium carbonate or the aluminosilicate material. In some embodiments, the methods further comprise grinding the carbonate material to a specific surface area of 100-3,000 $m^2$/kg before the mixing with the composition comprising calcium carbonate and/or the aluminosilicate material.

In some embodiments, the methods further comprise mixing Portland cement clinker with the aluminosilicate material before the blending with the composition comprising calcium carbonate (optionally further comprising insoluble solid). It is to be understood that the Portland cement clinker may be mixed with the composition comprising calcium carbonate, the carbonate material and/or the aluminosilicate material. The order of the addition of these components may vary.

In some embodiments, the methods further comprise adding water to the cement blend composition and transforming the reactive vaterite cement to aragonite cement and/or calcite upon dissolution and re-precipitation in water. The reactive vaterite cement has more than two times the solubility of limestone in water which results in faster kinetics and cementation and higher early compressive strengths. In some embodiments, the addition of the water results in the reaction of the reactive vaterite cement with the aluminosilicate material to form carboaluminate hydrates comprising monocarboaluminate, hemicarboaluminate, or combination thereof.

In some embodiments, the reactive vaterite cement composition further comprises magnesium oxide which in the presence of water transforms to magnesium hydroxide. In some embodiments, the magnesium hydroxide binds with the aragonite and/or the calcite resulting in the high compressive strength of the cement product.

During the mixing of the blended composition comprising calcium carbonate (optionally further comprising insoluble solid) with other components as mentioned herein and mixing with the aqueous medium, the blended composition may be subjected to high shear mixer. After mixing, the blended composition may be dewatered again and placed in pre-formed molds to make formed building materials or may be used to make formed building materials using the processes well known in the art or as described herein. Alternatively, the blended composition may be mixed with water and may be allowed to set. The blended composition may set over a period of days and may be then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The blended composition may be subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 40%, or 50%, or 60%, or 70%, or 90%, or 98% humidity.

The product produced by the methods described herein may be an aggregate or building material or a pre-cast material or a formed building material. In some embodiments, the product produced by the methods described herein includes artificial reefs. These products have been described herein.

The components of the blended composition can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

In one aspect, there are provided systems to form the composition, comprising (i) a dissolution reactor configured for dissolving the cement and/or the cement clinker in the aqueous N-containing salt solution to produce the aqueous solution comprising calcium salt (optionally further comprising insoluble solid); and (ii) a treatment reactor operably connected to the dissolution reactor configured for treating the aqueous solution comprising calcium salt with the gaseous stream comprising carbon dioxide to form the composition comprising calcium carbonate (optionally further comprising insoluble solid).

In one aspect, there are provided systems to form the composition, comprising (i) the dissolution reactor configured for dissolving the cement and/or the cement clinker in the aqueous N-containing salt solution to produce the first aqueous solution comprising calcium salt and the gaseous stream comprising ammonia; (ii) a cooling reactor configured for recovering the gaseous stream comprising carbon dioxide and the gaseous stream comprising ammonia and subjecting the gaseous stream to the cooling process under one or more cooling conditions to condense the second aqueous solution comprising ammonium bicarbonate, ammonium carbonate, ammonia, ammonia carbamate, or combination thereof; and (iii) a treatment reactor operably connected to the dissolution reactor and the cooling reactor configured for treating the first aqueous solution with the second aqueous solution under one or more precipitation conditions to form the composition comprising calcium carbonate. In some embodiments of the aforementioned aspect and embodiments, the dissolution reactor is integrated with the cooling reactor.

In some embodiments of the aforementioned aspects and embodiments, the system further comprises a calcination reactor configured for calcining limestone to form the cement and/or the cement clinker and the gaseous stream comprising carbon dioxide. In some embodiments of the aforementioned aspects and embodiments, the system further comprises the calcination reactor configured for calcining limestone and one or more of iron oxide, quartz, clay mineral, or combination thereof to the kiln to form the cement and/or the cement clinker and the gaseous stream comprising carbon dioxide. In some embodiments of the aforementioned aspects and embodiments, the system further comprises the calcination reactor configured for calcining limestone and one or more of iron oxide, quartz, clay mineral, or combination thereof to the kiln to form the Portland cement and/or the Portland cement clinker and the gaseous stream comprising carbon dioxide. In some embodiments of the aforementioned aspects and embodiments, the system further comprises a recovery system to recover the gaseous stream comprising carbon dioxide from the calcination reactor and transferring the gaseous stream comprising carbon dioxide to the treatment reactor.

In some embodiments of the aforementioned aspects and embodiments, the cement and/or the cement clinker is the Portland cement or the Portland cement clinker. In some embodiments of the aforementioned aspects and embodiments, the cement and/or the cement clinker is Portland cement (or Ordinary Portland Cement (OPC)), white Portland cement, Portland cement clinker, Portland-pozzolan cement, rapid hardening cement, quick setting cement, low heat cement, sulfate resisting cement, blast furnace slag cement, high alumina cement, colored cement, air entraining cement, expansive cement, hydrographic or hydrophobic cement, or combination thereof. In some embodiments, the cement and/or the cement clinker includes cement blends, such as, but not limited to, Portland-limestone cement, Portland-slag cement, Portland-pozzolan cement, Ternary blended cement, or combination thereof.

In some embodiments of the aforementioned aspects and embodiments, the system further comprises a blending reactor operably connected to the treatment reactor configured for blending the supplementary cementitious material (SCM) comprising aluminosilicate material with the composition comprising calcium carbonate to produce a cement blend composition.

In some embodiments of the aforementioned aspects and embodiments, the system further comprises a recovering system such as e.g., thermal decomposer to recover the N-containing salt from the aqueous solution to be recycled back to the dissolution reactor. The recovering system is the system configured to carry out thermal decomposition, reverse osmosis, multi-stage flash distillation, multi-effect distillation, vapor recompression, distillation, and combination thereof, as described herein above.

The methods and systems provided herein may be carried out at land (e.g., at a location close to the limestone quarry, or a location close to cement plant, or is easily and economically transported in), at cement plant, at sea, or in the ocean. In some embodiments, the cement plants calcining the limestone to form the cement and/or the cement clinker may be retro-fitted with the systems described herein to form the compositions and further to form products.

Aspects include systems, including processing plants or factories, for practicing the methods as described herein. Systems may have any configuration that enables practice of the particular production method of interest.

In certain embodiments, the systems include a source of the limestone or a source of the cement and/or the cement clinker and a structure having an input for the aqueous N-containing salt solution. For example, the systems may include a pipeline or analogous feed of aqueous solution, wherein the aqueous solution is as described herein. The system further includes an input for $CO_2$ as well as components for combining these sources with water (optionally an aqueous solution such as water, brine, or seawater) before the precipitation reactor or in the precipitation reactor. In some embodiments, the gas-liquid contactor is configured to contact enough $CO_2$ to produce the composition in excess of 1, 10, 100, 1,000, or 10,000 tons per day.

The systems further include a precipitation reactor that subjects the water introduced to the precipitation reactor to the one or more precipitation conditions (as described herein) and produces the composition (optionally further comprising the insoluble solid) and supernatant. In some embodiments, the precipitation reactor is configured to hold water sufficient to produce the composition in excess of 1, 10, 100, 1,000, or 10,000 tons per day. The precipitation reactor may also be configured to include any of a number of different elements such as temperature modulation elements (e.g., configured to heat the water to a desired temperature), chemical additive elements (e.g., configured for introducing additives etc. into the precipitation reaction mixture), computer automation, and the like.

The gaseous waste stream comprising $CO_2$ and optionally $NH_3$ may be provided to the precipitation reactor and/or the cooling reactor in any convenient manner. In some embodiments, the gaseous waste stream is provided with a gas conveyer (e.g., a duct) that runs from the dissolution reactor to the precipitation reactor and/or the cooling reactor.

Where the water source that is processed by the system to produce the precipitation material is seawater, the input is in fluid communication with a source of sea water, e.g., such as where the input is a pipeline or feed from ocean water to a land-based system or an inlet port in the hull of ship, e.g., where the system is part of a ship, e.g., in an ocean-based system.

The methods and systems may also include one or more detectors configured for monitoring the aqueous N-containing salt solution, the cement and/or the cement clinker, the insoluble solid, the limestone, and/or the carbon dioxide and/or ammonia (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the aqueous N-containing salt solution, the cement and/or the cement clinker, the limestone, and/or the carbon dioxide/ammonia gas. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters at regular intervals, e.g., determining the composition every 1 minute, every 5 minutes, every 10 minutes, every 30 minutes, every 60 minutes, every 100 minutes, every 200 minutes, every 500 minutes, or some other interval.

In certain embodiments, the system may further include a station for preparing a building material, such as cement or aggregate, from the composition. Other materials such as formed building materials may also be formed from the composition and appropriate station may be used for preparing the same.

As indicated above, the system may be present on land or sea. For example, the system may be land-based system that is in a coastal region, e.g., close to a source of seawater, or even an interior location, where water is piped into the system from a water source, e.g., ocean. Alternatively, the system is a water-based system, i.e., a system that is present on or in water. Such a system may be present on a boat, ocean-based platform etc., as desired.

Calcium carbonate slurry may be pumped via pump to drying system, which in some embodiments includes a filtration step followed by spray drying. The water separated from the drying system is discharged or is recirculated to the reactor. The resultant solid or powder from the drying system is the composition comprising calcium carbonate (optionally further comprising the insoluble solid) utilized as cement or aggregate to produce building materials. The solid or powder may also be used in forming formed building materials, such as drywall, cement boards, etc.

In some embodiments, the systems may include a control station, configured to control the amount of the aqueous N-containing salt solution and/or the amount of the cement conveyed to the precipitator or the dissolution reactor; the amount of the precipitate conveyed to the separator; the amount of the precipitate conveyed to the drying station; and/or the amount of the precipitate conveyed to the refining station. A control station may include a set of valves or multi-valve systems which are manually, mechanically, or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

II. Compositions

The composition formed in the methods and systems provided herein, comprises calcium carbonate. In some embodiments, the calcium carbonate is a crystalline calcium carbonate, amorphous calcium carbonate, or combination thereof. In some embodiments, the calcium carbonate is in crystalline polymorphic form of vaterite, aragonite, calcite, or combination thereof. In some embodiments, the calcium carbonate is PCC. In some embodiments, the vaterite is reactive vaterite or stable vaterite.

Provided herein also is composition comprising calcium carbonate and insoluble solid wherein the insoluble solid comprises calcium silicate hydrate (C—S—H). As described herein, the C—S—H seed particle(s) (in the insoluble solid) present in the composition comprising calcium carbonate, provides nucleation sites to grow calcium silicate hydrate from the di-calcium and/or tri-calcium silicates present in the Portland cement leading to accelerated hydration of the Portland cement and faster cementation. In some embodiments, when the composition comprises reactive vaterite and insoluble solid wherein the insoluble solid comprises calcium silicate hydrate (C—S—H), the C—S—H seed particle(s) also accelerates transformation of the reactive vaterite to aragonite, calcite, or combination thereof.

In some embodiments, the composition comprising calcium carbonate is self-cementing as it sets and hardens into cement (other components may be added to this, such as, e.g., OPC, aluminosilicate material, limestone, etc. as described herein) and/or the composition comprising calcium carbonate is used as a supplementary cementitious material in other cement compositions.

The aragonite and/or calcite may impart one or more unique characteristics to the product including, but not limited to, high compressive strength, complex microstructure network and binding, etc. During the dissolution-reprecipitation process of the reactive vaterite cement in water, transformation of the vaterite to the aragonite and/or the calcite takes place.

In some embodiments, the composition comprising calcium carbonate further comprises magnesium oxide which after hydration forms magnesium hydroxide that binds to the formed aragonitic cement and/or the calcite resulting in high durability and strength. Various other components can be blended in the composition, such as but not limited to, Portland cement clinker, carbonate material, alkali metal accelerator, or alkaline earth metal accelerator etc.

In some embodiments of the foregoing aspects and embodiments, the composition comprising calcium carbonate comprises 50% w/w to 99% w/w reactive vaterite, stable vaterite, aragonite, calcite, amorphous phase, or combination thereof; or from 50% w/w to 95% w/w reactive vaterite, stable vaterite, aragonite, calcite, amorphous phase, or combination thereof; or from 50% w/w to 90% w/w reactive vaterite, stable vaterite, aragonite, calcite, amorphous phase, or combination thereof; or from 50% w/w to 75% w/w reactive vaterite, stable vaterite, aragonite, calcite, amorphous phase, or combination thereof; or from 60% w/w to 99% w/w reactive vaterite, stable vaterite, aragonite, calcite, amorphous phase, or combination thereof; or from 60% w/w to 95% w/w reactive vaterite, stable vaterite, aragonite, calcite, amorphous phase, or combination thereof; or from 60% w/w to 90% w/w reactive vaterite, stable vaterite, aragonite, calcite, amorphous phase, or combination thereof; or from 70% w/w to 99% w/w reactive vaterite, stable vaterite, aragonite, calcite, amorphous phase, or combination thereof; or from 70% w/w to 95% w/w reactive vaterite, stable vaterite, aragonite, calcite, amorphous phase, or combination thereof; or from 70% w/w to 90% w/w reactive vaterite, stable vaterite, aragonite, calcite, amorphous phase, or combination thereof; or from 80% w/w to 99% w/w reactive vaterite, stable vaterite, aragonite, calcite, amorphous phase, or combination thereof; or from 80% w/w to 95% w/w reactive vaterite, stable vaterite, aragonite, calcite, amorphous phase, or combination thereof; or from 80% w/w to 90% w/w reactive vaterite, stable vaterite, aragonite, calcite, amorphous phase, or combination thereof; or from 90% w/w to 99% w/w reactive vaterite, stable vaterite, aragonite, calcite, amorphous phase, or combination thereof; or 50% w/w reactive vaterite, stable vaterite, aragonite, calcite, amorphous phase, or combination thereof; or 60% w/w reactive vaterite, stable vaterite, aragonite, calcite, amorphous phase, or combination thereof; or 70% w/w reactive vaterite, stable vaterite, aragonite, calcite, amorphous phase, or combination thereof; or 80% w/w reactive vaterite, stable vaterite, aragonite, calcite, amorphous phase, or combination thereof; or 90% w/w reactive vaterite, stable vaterite, aragonite, calcite, amorphous phase, or combination thereof; or 95% w/w reactive vaterite, stable vaterite, aragonite, calcite, amorphous phase, or combination thereof; or 99% w/w reactive vaterite, stable vaterite, aragonite, calcite, amorphous phase, or combination thereof.

In some embodiments of the foregoing aspects and embodiments, the composition comprising calcium carbonate comprises 50% w/w to 99% w/w reactive vaterite; or from 50% w/w to 95% w/w reactive vaterite; or from 50% w/w to 90% w/w reactive vaterite; or from 50% w/w to 75% w/w reactive vaterite; or from 60% w/w to 99% w/w reactive vaterite; or from 60% w/w to 95% w/w reactive vaterite; or from 60% w/w to 90% w/w reactive vaterite; or from 70% w/w to 99% w/w reactive vaterite; or from 70% w/w to 95% w/w reactive vaterite; or from 70% w/w to 90% w/w reactive vaterite; or from 80% w/w to 99% w/w reactive vaterite; or from 80% w/w to 95% w/w reactive vaterite; or from 80% w/w to 90% w/w reactive vaterite; or from 90% w/w to 99% w/w reactive vaterite; or 50% w/w reactive vaterite; or 60% w/w reactive vaterite; or 70% w/w reactive vaterite; or 75% w/w reactive vaterite; or 80% w/w reactive vaterite; or 85% w/w reactive vaterite; or 90% w/w reactive vaterite; or 95% w/w reactive vaterite; or 99% w/w reactive vaterite. In some embodiments, the remaining amount in the foregoing amounts is other polymorphs of calcium carbonate, such as but not limited to amorphous phase, aragonite and/or calcite. In some embodiments of the blended compositions provided herein, the reactive vaterite cement material includes 95-99.9% reactive vaterite.

In some embodiments, the composition comprising calcium carbonate comprises between about 0.1-85 wt % insoluble solid or between about 0.1-80 wt % insoluble solid or between about 0.1-75 wt % insoluble solid or between about 0.1-70 wt % insoluble solid or between about 0.1-60 wt % insoluble solid; and between about 15-99.9 wt % calcium carbonate or between about 25-99.9 wt % calcium carbonate or between about 35-99.9 wt % calcium carbonate or between about 50-99.9 wt % calcium carbonate. In some embodiments, the composition comprising calcium carbonate comprises between about 0.1-85 wt % insoluble solid or between about 0.1-80 wt % insoluble solid or between about 0.1-75 wt % insoluble solid or between about 0.1-70 wt % insoluble solid; and between about 15-35 wt % calcium carbonate or between about 15-30 wt % calcium carbonate or between about 15-25 wt % calcium carbonate.

In some embodiments of the foregoing aspects and embodiments, the reactive vaterite or the stable vaterite has a specific surface area of between about 100-10,000 $m^2$/kg; or between about 100-9,000 $m^2$/kg; or between about 100-8,000 $m^2$/kg; or between about 100-7,000 $m^2$/kg; or between about 100-6,000 $m^2$/kg; or between about 100-5,000 $m^2$/kg; or between about 100-4,000 $m^2$/kg; or between about 100-3,000 $m^2$/kg; or between about 100-2,000 $m^2$/kg; or between about 100-1,000 $m^2$/kg; or between about 100-500 $m^2$/kg; or between about 500-10,000 $m^2$/kg; or between about 500-9,000 $m^2$/kg; or between about 500-8,000 $m^2$/kg; or between about 500-7,000 $m^2$/kg; or between about 500-6,000 $m^2$/kg; or between about 500-5,000 $m^2$/kg; or between about 500-4,000 $m^2$/kg; or between about 500-3,000 $m^2$/kg; or between about 500-2,000 $m^2$/kg; or between about 500-1,000 $m^2$/kg; or between about 1,000-10,000 $m^2$/kg; or between about 1,000-9,000 $m^2$/kg; or between about 1,000-8,000 $m^2$/kg; or between about 1,000-7,000 $m^2$/kg; or between about 1,000-6,000 $m^2$/kg; or between about 1,000-5,000 $m^2$/kg; or between about 1,000-4,000 $m^2$/kg; or between about 1,000-3,000 $m^2$/kg; or between about 1,000-2,000 $m^2$/kg; or between about 2,000-3,000 $m^2$/kg; or between about 2,000-10,000 $m^2$/kg; or between about 3,000-10,000 $m^2$/kg; or between about 4,000-10,000 $m^2$/kg; or between about 5,000-10,000 $m^2$/kg; or between about 6,000-10,000 $m^2$/kg; or between about 7,000-10,000 $m^2$/kg; or between about 8,000-10,000 $m^2$/kg.

In some embodiments, the reactive vaterite or the stable vaterite or aragonite or calcite has spherical particle shape having an average particle size of between 0.1-100 μm (micron). The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the composition comprising the reactive vaterite, the stable vaterite, the aragonite, the calcite, or the combination thereof is a particulate composition with an average particle size of 0.1-100 micron; or 0.1-50 micron; or 0.1-20 micron; or 0.1-10 micron; or 0.1-5 micron; or 1-50 micron; or 1-25 micron; or 1-20 micron; or 1-10 micron; or 1-5 micron; or 5-70 micron; or 5-50 micron; or 5-20 micron; or 5-10 micron; or 10-100 micron; or 10-50 micron; or 10-20 micron; or 10-15 micron; or 15-50 micron; or 15-30 micron; or 15-20 micron; or 20-50 micron; or 20-30 micron; or 30-50 micron; or 40-50 micron; or 50-100 micron; or 50-60 micron; or 60-100 micron; or 60-70 micron; or 70-100 micron; or 70-80 micron; or 80-100 micron; or 80-90 micron; or 0.1 micron; or 0.5 micron; or 1 micron; or 2 micron; or 3 micron; or 4 micron; or 5 micron; or 8 micron; or 10 micron; or 15 micron; or 20 micron; or 30 micron; or 40 micron; or 50 micron; or 60 micron; or 70 micron; or 80 micron; or 100 micron. For example, in some embodiments, the composition is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the composition comprising the reactive vaterite, the stable vaterite, the aragonite, the calcite, or the combination thereof includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, and/or sub-micron sizes of the particles.

In some embodiments, other components may be blended with the composition comprising calcium carbonate, such as but not limited to, supplementary cementitious material. As used herein, "supplementary cementitious material" (SCM)

includes SCM as is well known in the art. Various examples of the SCM have been provided herein. Few examples include without limitation, fly ash, slag cement (ground, granulated blast-furnace slag), silica fume, etc.

In some embodiments, other components may be blended with the composition comprising calcium carbonate, such as but not limited to, aluminosilicate material. The aluminosilicate material as used herein includes any material that is rich in aluminate and silicate minerals. These materials can be natural or man-made. In some embodiments of the foregoing aspects and embodiments, the aluminosilicate material comprises heat-treated clay or shale, natural or artificial pozzolan, granulated blast furnace slag, or combination thereof. In some embodiments of the foregoing aspects and embodiments, the natural or artificial pozzolan is selected from the group consisting of fly ash, volcanic ash, or mixture thereof. Pozzolan may be naturally available and comprise very fine particles of siliceous and aluminous material that in presence of water may react with Ca ions in the calcium carbonate to form cementitious material.

Clay is a type of fine-grained natural soil material containing clay mineral. Clay may develop plasticity when wet, due to a molecular film of water surrounding the clay particles, but may become hard, brittle and non-plastic upon drying or firing. Shale, formed largely from clay, may be the most common sedimentary rock. Although many naturally occurring deposits include both silts and clay, clays may be distinguished from other fine-grained soils by differences in size and mineralogy.

The clay material (or the untreated clay material) may belong to mineral selected from the group consisting of kaolin group, illite group, chlorite group, smectite group, vermiculite group, or mixture thereof. The main groups of clay may include, but not limited to, kaolinite, montmorillonite-smectite, and illite. Chlorite, vermiculite, talc, and pyrophyllite may sometimes be classified as clay mineral. There may be approximately 30 different types of pure clays in these categories, but most natural clay deposits may be mixtures of these different types, along with other weathered minerals. Clay mineral in clay may be mostly identified using X-ray diffraction. In some embodiments of the foregoing aspects and embodiments, the kaolin group include, but not limited to, kaolinite, dickite, nacrite, halloysite, or mixture thereof. In some embodiments of the foregoing aspects and embodiments, the smectite group includes, but not limited to, dioctahedral smectite, trioctahedral smectite, or mixture thereof. In some embodiments of the foregoing aspects and embodiments, the dioctahedral smectite includes, but not limited to, montmorillonite and/or nontronite and/or the trioctahedral smectite includes, but not limited to, saponite.

In the embodiments provided herein, the clay material (or the untreated clay material) may be heat treated to form the heat-treated clay material. In some embodiments of the foregoing aspects and embodiments, the heat-treated clay is obtained from the clay or from the untreated clay belonging to the mineral of the kaolin group, illite group, chlorite group, smectite group, vermiculite group, or mixture thereof. In the embodiments provided herein, the clay material (or the untreated clay material) may be heat treated at 750-850° C. to form the heat-treated or the activated clay material. For example only, calcined clay or metakaolin may be produced by heating a source of kaolinite to between 650° C. and 750° C. Kaolin is both naturally occurring, as in China clay deposits and some tropical soils, as well as in industrial by-products, such as some paper sludge waste and oil sands tailings.

The aforementioned clay material may be pozzolanic (or reactive) in raw state or untreated state and/or heat-treated state. Raw or untreated clay may have a moderate or low pozzolanic activity which may be increased by activation. The activation includes mechanical and/or thermal activation. As a result of the activation, the clay mineral may undergo processes of dehydroxylation and amorphization and the accompanying change in coordination of Al ions. Those processes may lead to, among other things, greater solubility of Al and Si ions and their greater reactivity. The activation process may be carried out mechanically (e.g., by grinding) or thermally by heating to a temperature high enough to destroy the structure of the clay mineral, but low enough to avoid recrystallization and the formation of chemically inert phase. For example, the kaolinitic clay may be ground before they undergo calcination, i.e., their activation may have both the mechanical and the thermal component.

In some embodiments of the foregoing aspects and embodiments, the heat-treated clay includes, but not limited to, calcined clay, aluminosilicate glass, calcium aluminosilicate glass, or combination thereof.

In some embodiments, the grinding and/or heating of the clay material may influence the particle size of the clay. In some embodiments of the foregoing aspects and embodiments, the heat-treated clay comprises material that predominately passes a 45 μm sieve. In some embodiments of the foregoing aspects and embodiments, the heat-treated clay comprises more than 0.5% by weight of the material that passes a 45 μm sieve; or more than 1% by weight of the material that passes a 45 μm sieve; or between 1-10% by weight of the material that passes a 45 μm sieve. In some embodiments of the foregoing aspects and embodiments, the heat-treated clay comprises more than 0.5% by weight of the clay material having median particle size of between about 5-10 micron; or between about 6-10 micron; or between about 7-10 micron; or between about 8-10 micron; or between about 9-10 micron.

In some embodiments of the foregoing aspects and embodiments, the composition comprising calcium carbonate further comprises Ordinary Portland cement (OPC) or Portland cement clinker. Limestone calcined clay cement comprising calcium carbonate provided herein, is a ternary binder system with lower $CO_2$ emission, made of the Portland cement clinker, the composition comprising calcium carbonate, the aluminosilicate material, e.g., calcined clay, and optionally carbonate material e.g., limestone and/or gypsum. As described herein, the C—S—H seed particle(s) (in the insoluble solid) present in the composition comprising calcium carbonate, provides nucleation sites to grow calcium silicate hydrate from the di-calcium and/or tri-calcium silicates present in the Portland cement leading to the accelerated hydration of the Portland cement and faster cementation. In some embodiments, the insoluble solid comprising the C—S—H seed particle(s) further comprises one or more components selected from the group consisting of calcium carbonate, silica, aluminate, sulfate, silicate, ferrite, alite, belite, amorphous phase, and combination thereof. In some embodiments, the insoluble solid comprising the C—S—H seed particle(s) is obtained from the kiln feed components (either limestone and/or other components such as, e.g., one or more of iron oxide, aluminum oxide, quartz, clay mineral, or combination thereof) that did not react within the kiln; undissolved clinker phase; hydrate; amorphous phase; or combination thereof.

In some embodiments of the foregoing aspects and embodiments, the Portland cement clinker is ground to a specific surface area of 150-1000 $m^2$/kg; or between 150-500 $m^2$/kg; or between 150-200 $m^2$/kg; or between 100-150 $m^2$/kg; or between 200-500 $m^2$/kg. In some embodiments of the foregoing aspects and embodiments, the composition comprising calcium carbonate and the SCM comprising aluminosilicate material, and optionally limestone and/or alkali metal or alkaline earth metal accelerator (described further herein) further comprises between 5-90% by weight of the Portland cement clinker; or between 5-80% by weight; or between 5-70% by weight; or between 5-60% by weight; or between 5-50% by weight; or between 5-40% by weight; or between 5-30% by weight; or between 5-20% by weight; or between 5-10% by weight; or between 10-90% by weight; or between 10-80% by weight; or between 10-70% by weight; or between 10-60% by weight; or between 10-50% by weight; or between 10-40% by weight; or between 10-30% by weight; or between 10-20% by weight; or between 20-90% by weight; or between 20-80% by weight; or between 20-70% by weight; or between 20-60% by weight; or between 20-50% by weight; or between 20-40% by weight; or between 20-30% by weight; or between 30-90% by weight; or between 30-80% by weight; or between 30-70% by weight; or between 30-60% by weight; or between 30-50% by weight; or between 30-40% by weight; or between 40-90% by weight; or between 40-80% by weight; or between 40-70% by weight; or between 40-60% by weight; or between 40-50% by weight; or between 50-90% by weight; or between 50-80% by weight; or between 50-70% by weight; or between 50-60% by weight; or between 60-90% by weight; or between 60-80% by weight; or between 60-70% by weight; or between 70-90% by weight; or between 70-80% by weight; or between 80-90% by weight of the Portland cement clinker.

In some embodiments of the blended composition provided herein, the SCM in the composition further comprises a "carbonate material" comprising limestone, calcium carbonate, magnesium carbonate, calcium magnesium carbonate, or combination thereof. Various forms of the limestone have been described herein. The limestone also serves as a feedstock to produce the cement used in making the composition comprising calcium carbonate, as described herein. It is to be understood that the "carbonate material" is different from the composition comprising calcium carbonate and is externally added to the composition comprising calcium carbonate to form the blended compositions.

In some embodiments of the blended compositions provided herein, the composition comprising calcium carbonate as provided herein partially or completely substitutes the Portland cement clinker in the limestone calcined clay cement and/or partially or completely substitutes the limestone or the ground calcium carbonate (GCC) in the limestone calcined clay cement.

In some embodiments of the foregoing aspects and embodiments, the limestone is heat-treated limestone. The heat-treated limestone may be produced by calcining the limestone to high temperatures. In some embodiments, the limestone may be calcined in a same calciner as the calciner for Portland cement clinker and/or the calciner for the aluminosilicate material and/or calciner used in the process to produce the composition comprising calcium carbonate.

In some embodiments of the foregoing aspects and embodiments, the limestone or the heat-treated limestone is ground to a specific surface area of between about 100-5,000 $m^2$/kg; or between about 100-4,000 $m^2$/kg; or between about 100-3,000 $m^2$/kg; or between about 100-2,000 $m^2$/kg; or between about 100-1,000 $m^2$/kg; or between about 100-500 $m^2$/kg; or between about 500-5,000 $m^2$/kg; or between about 500-4,000 $m^2$/kg; or between about 500-3,000 $m^2$/kg; or between about 500-2,000 $m^2$/kg; or between about 500-1,000 $m^2$/kg; or between about 1,000-5,000 $m^2$/kg; or between about 1,000-4,000 $m^2$/kg; or between about 1,000-3,000 $m^2$/kg; or between about 1,000-2,000 $m^2$/kg; or between about 2,000-5,000 $m^2$/kg; or between about 2,000-4,000 $m^2$/kg; or between about 2,000-3,000 $m^2$/kg; or between about 3,000-5,000 $m^2$/kg; or between about 3,000-4,000 $m^2$/kg; or between about 4,000-5,000 $m^2$/kg.

In some embodiments of the blended compositions provided herein, the composition comprising calcium carbonate further comprises an alkali metal accelerator or an alkaline earth metal accelerator. In some embodiments, the alkali metal or the alkaline earth metal accelerator facilitates early development of strength in the cement. The alkali metal or the alkaline earth metal accelerator includes, but not limited to any alkali metal or an alkaline earth metal salt, such as e.g., sodium sulfate, sodium carbonate, sodium nitrate, potassium sulfate, potassium carbonate, potassium nitrate, lithium sulfate, lithium carbonate, lithium nitrate, calcium sulfate (or gypsum), calcium nitrate, potassium hydroxide, and combination thereof. In some embodiments of the blended compositions provided herein, the composition comprises between about 0.1-5% by weight alkali metal or alkaline earth metal accelerator, e.g., lithium carbonate; or between about 0.1-4% by weight; or between about 0.1-3% by weight; or between about 0.1-2% by weight; or between about 0.1-1% by weight; or between about 0.1-0.5% by weight; or between about 1-5% by weight; or between about 1-4% by weight; or between about 1-3% by weight; or between about 1-2% by weight; or between about 2-5% by weight; or between about 2-4% by weight; or between about 2-3% by weight; or between about 3-5% by weight; or between about 3-4% by weight; or between about 4-5% by weight.

In some embodiments of the foregoing aspects and embodiments, the composition may include a blend of by weight about 75% OPC or Portland cement clinker and between about 1-25% composition comprising calcium carbonate; or about 80% OPC or Portland cement clinker and between about 1-20% composition comprising calcium carbonate; or about 85% OPC or Portland cement clinker and between about 1-15% composition comprising calcium carbonate; or about 90% OPC or Portland cement clinker and between about 1-10% composition comprising calcium carbonate; or about 95% OPC or Portland cement clinker and between about 1-5% composition comprising calcium carbonate. In some embodiments of the foregoing aspects and embodiments, the remaining amount in the composition may include one or more of the aluminosilicate materials, and optionally the carbonate material and the alkali metal or alkaline earth metal accelerator.

In some embodiments of the foregoing aspects and embodiments, weight ratio of the aluminosilicate material to the carbonate material in the blended composition provided herein is between about 0.1:1 to 10:1; or between about 1:1 to 10:1; or between about 5:1 to 10:1; or between about 8:1 to 10:1.

In some embodiments of the foregoing aspects and embodiments, weight ratio of the composition comprising calcium carbonate to the SCM in the blended composition provided herein is between about 0.1:1 to 10:1; or between about 1:1 to 10:1; or between about 5:1 to 10:1; or between about 8:1 to 10:1.

In some embodiments of the blended composition provided herein, the composition comprises by weight between about 10-60% composition comprising calcium carbonate, between about 10-35% aluminosilicate material, and between about 0-10% carbonate material. In some embodiments of the blended composition provided herein, the composition comprises by weight between about 10-50% composition comprising calcium carbonate, between about 10-35% aluminosilicate material, between about 0-10% carbonate material, and between about 15-90% Portland cement clinker. In some embodiments of the blended composition provided herein, the composition comprises by weight between about 10-50% composition comprising calcium carbonate, between about 10-35% aluminosilicate material, between about 0-10% carbonate material, between about 15-90% Portland cement clinker, and between about 0.1-5% alkali metal or alkaline earth metal accelerator.

In some embodiments of the blended composition provided herein, the composition comprises by weight between about 10-50% composition comprising calcium carbonate, between about 10-35% calcined clay, between about 0-10% limestone, and between about 15-90% Portland cement clinker. In some embodiments of the blended composition provided herein, the composition comprises by weight between about 10-50% composition comprising calcium carbonate, between about 10-35% calcined clay, between about 0-10% limestone, between about 15-90% Portland cement clinker, and between about 0.1-5% gypsum or lithium carbonate.

In some embodiments of the blended composition provided herein, the composition comprises by weight between about 10-20% composition comprising calcium carbonate, between about 10-25% calcined clay, between about 0-10% limestone, between about 25-55% Portland cement clinker, and between about 2-5% gypsum or lithium carbonate. In some embodiments of the blended composition provided herein, the composition comprises by weight between about 25-35% composition comprising calcium carbonate, between about 25-35% calcined clay, between about 0-5% limestone, between about 25-35% Portland cement clinker, and between about 2-5% gypsum or lithium carbonate.

In some embodiments, the composition provided herein in wet or dried form may further include one or more plasticizers. Examples of plasticizer include, without limitation, polycarboxylate based superplasticizer, MasterGlenium 7920, MasterGlenium 7500, Fritz-Pak Supercizer PCE, sodium salt of poly(naphthalene sulfonic acid), Fritz-Pak Supercizer 5, and the like.

In some embodiments, the composition provided herein in wet or dried form may further include an aggregate. Aggregate may provide for mortars which include fine aggregate and concretes which also include coarse aggregate. The fine aggregate may be material that almost entirely passes through a Number 4 sieve (ASTM C 125 and ASTM C 33), such as silica sand. The coarse aggregate may be material that is predominantly retained on a Number 4 sieve (ASTM C 125 and ASTM C 33), such as silica, quartz, crushed marble, glass spheres, granite, calcite, feldspar, alluvial sands, sands or any other durable aggregate, and mixture thereof. As such, the aggregate is used broadly to refer to several different types of both coarse and fine particulate material, including, but are not limited to, sand, gravel, crushed stone, slag, and recycled concrete. The amount and nature of the aggregate may vary widely. In some embodiments, the amount of aggregate may range from 5 to 75% w/w of the blended compositions provided herein. In some embodiments, the aggregate is repurposed or reused concrete.

In some embodiments, the compositions provided herein in wet or dried form, may further include one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures ranges from 0.1 to 10% w/w. Examples of the admixtures include, but not limited to, set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforced material such as fiber, and any other admixture. When using an admixture, the blended composition to which the admixture raw materials are introduced, is mixed for sufficient time to cause the admixture raw materials to be dispersed relatively uniformly throughout the composition.

Set accelerator may be used to accelerate the setting and early strength development of cement. Examples of set accelerator that may be used include, but are not limited to, POZZOLITH® NC534, non-chloride type set accelerator and/or RHEOCRETE® CNI calcium nitrite-based corrosion inhibitor. Set retarding, also known as delayed-setting or hydration control, admixtures are used to retard, delay, or slow the rate of setting of cement. Most set retarders may also act as low-level water reducers and can also be used to entrain some air into product. The air entrainer includes any substance that will entrain air in the compositions. Some air entrainers can also reduce the surface tension of a composition at low concentration. Air-entraining admixtures are used to purposely entrain microscopic air bubbles into cement. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof.

In some embodiments, the composition provided herein in wet or dried form may further include foaming agent. The foaming agents incorporate large quantities of air voids/porosity and facilitate reduction of the material's density. Examples of foaming agents include, but not limited to, soap, detergent (alkyl ether sulfate), Millifoam™ (alkyl ether sulfate), Cedepal™ (ammonium alkyl ethoxy sulfate), Witcolate™ 12760, and the like.

In some embodiments, the composition provided herein in wet or dried form may further include defoamer. Defoamers are used to decrease the air content in the cementitious composition. In some embodiments, the composition provided herein in wet or dried form may further include dispersant. The dispersant includes, but is not limited to, polycarboxylate dispersants, with or without polyether units. The dispersant includes those chemicals that also function as a plasticizer, water reducer such as a high range water reducer, fluidizer, anti-flocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant, polyaspartates, or oligomeric dispersants. In some embodiments, the blended composition provided herein in wet or dried form may further include polycarboxylate dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. In some embodiments, the compositions provided herein in wet or dried form may further include corrosion inhibitors. Corrosion inhibitors may serve to protect embedded reinforcing steel from corrosion. The materials commonly used to inhibit corrosion are calcium nitrite, sodium nitrite, sodium benzoate, certain phosphates or fluorosilicates, fluoroaluminites, amines and related chemicals. In some embodiments, the compositions provided herein in wet or dried form may further include damp-proofing admixtures. Damp-proofing admixtures reduce the permeability of the product that has low cement contents, high water-cement ratios, or a deficiency of fines in the aggregate. These admixtures may retard moisture penetration into dry products and include certain soaps, stearates, and petroleum products. In some embodiments, the compositions provided herein in wet or dried form may further include gas former admixtures. Gas formers, or gas-forming agents, are sometimes added to the mix to cause a slight expansion prior to hardening. The amount of expansion may be dependent upon the amount of gas-forming material used and the temperature of the fresh mixture. Aluminum powder, resin soap and vegetable or animal glue, saponin or hydrolyzed protein can be used as gas formers. In some embodiments, the compositions provided herein in wet or dried form may further include permeability reducers. Permeability reducers may be used to reduce the rate at which water under pressure is transmitted through the mix. Silica fume, fly ash, ground slag, natural pozzolans, water reducers, and latex may be employed to decrease the permeability of the mix.

In some embodiments, the compositions provided herein in wet or dried form may further include rheology modifying agent admixtures. Rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

In some embodiments, the composition provided herein in wet or dried form may further include shrinkage compensation admixture. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the composition provided herein in wet or dried form may further include reinforced material such as fiber, e.g., where fiber-reinforced product is desirable. Fibers can be made of zirconia containing materials, aluminum, glass, steel, carbon, ceramic, grass, bamboo, wood, fiberglass, or synthetic material, e.g., polypropylene, polycarbonate, polyvinyl chloride, polyvinyl alcohol, nylon, polyethylene, polyester, rayon, high-strength aramid, (i.e., Kevlar®), or mixture thereof.

In some embodiments of the composition provided herein, the composition has a pH of between 10-14, or between 10-13, or between 10-12, or between 10-11, or between 12-14.

In some embodiments of the foregoing aspects and the foregoing embodiments, the composition provided herein after combination with water, setting, and hardening has a compressive strength of at least 3 MPa; at least 7 MPa; at least 14 MPa; or at least 16 MPa; or at least 18 MPa; or at least 20 MPa; or at least 21 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 21 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa; or 45 MPa to 60 MPa. In some embodiments, the compressive strengths described herein are the compressive strengths after 1 day, or 3 days, or 7 days, or 28 days, or 56 days, or longer. In some embodiments, the composition after setting and hardening has a 28-day compressive strength of at least 21 MPa.

In one aspect, there are provided concrete mixes comprising any of the foregoing compositions.

III. Products

Examples of various cement and concrete products formed from the composition comprising calcium carbonate where the calcium carbonate is in polymorphic form such as, e.g., reactive vaterite, stable vaterite, aragonite, calcite, and/or amorphous phase, have been provided herein. The product (product in the figures) shows one or more unexpected properties, including but not limited to, high compressive strength, low porosity or permeability, high porosity (low density or light weight), microstructure network, low $CO_2$ emissions, etc.

One example of the cement or the concrete product formed from the compositions provided herein, is a building material. The "building material" used herein includes material used in construction. In one aspect, there is provided a structure, or a building material made from the composition comprising calcium carbonate. In one aspect, there is provided a structure, or a building material made from the set and hardened form of the composition comprising calcium carbonate and optionally comprising SCM comprising aluminosilicate material. In some embodiments, the composition comprising calcium carbonate further comprises other components and/or other SCM materials, such as, but not limited to, Portland cement clinker, carbonate material, calcium sulfate, alkali metal accelerator, additive, admixture, etc. Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof.

One example of the cement or the concrete product formed from the composition comprising the calcium carbonate provided herein, is a formed building material. The "formed building material" used herein includes materials shaped (e.g., molded, cast, cut, or otherwise produced) into structures with defined physical shape. In one aspect, there is provided a formed building material made from the composition comprising calcium carbonate. In one aspect, there is provided a formed building material made from the set and hardened form of the composition comprising calcium carbonate and optionally SCM comprising aluminosilicate material. In some embodiments, the composition comprising the calcium carbonate further comprises other components and/or other SCM materials (blended cement compositions), such as, but not limited to, Portland cement clinker, carbonate material, calcium sulfate, alkali metal accelerator, additive, admixture, etc.

The formed building material may be a pre-cast building material, such as, a pre-cast cement or concrete product. The formed building materials may vary greatly and include materials shaped (e.g., molded, cast, cut, or otherwise produced) into structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the compositions provided herein are employed in making such materials.

In some embodiments, the formed building materials made from the compositions provided herein have a compressive strength or the flexural strength of at least 3 MPa, at least 10 MPa, or at least 14 MPa, or between 3-30 MPa, or between about 14-100 MPa, or between about 14-45 MPa.

Examples of the formed building materials that can be produced by the foregoing methods and systems, include, but not limited to, masonry unit, for example only, brick, block, and tile including, but not limited to, ceiling tile; construction panel, for example only, cement board (boards traditionally made from cement such as fiber cement board) and/or drywall (boards traditionally made from gypsum); conduits; basins; beam; column, slab; acoustic barrier; insulation material; or combination thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the precipitation material provided herein include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g. surface reinforcement with glass fiber mat), fiberglass mesh reinforced board (e.g. surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment. The cement boards made by the methods and systems provided herein are made from the composition comprising the calcium carbonate as provided herein that partially or wholly replaces the traditional Portland cement in the board. In some embodiments, the cement boards may comprise construction panels prepared as a combination of the aragonitic and/or the calcite (e.g., setting and hardening when the reactive vaterite transforms to the aragonite and/or the calcite) and fiber and/or fiberglass and may possess additional fiber and/or fiberglass reinforcement at both faces of the board. The cement boards are formed building materials which in some embodiments, are used as backer boards for ceramics that may be employed behind bathroom tiles, kitchen counters, backsplashes, etc. and may have lengths ranging from 100 to 200 cm. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas). In addition, a variety of further components may be added to the cement boards which include, but are not limited to, plasticizers, clay, foaming agents, accelerators, retarders, and air entrainment additives. The composition is then poured out into sheet molds, or a roller may be used to form sheets of a desired thickness. The shaped composition may be further compacted by roller compaction, hydraulic pressure, vibrational compaction, or resonant shock compaction. The sheets are then cut to the desired dimensions of the cement boards.

Another type of construction panel formed from the composition comprising the calcium carbonate as described herein is backer board. The backer board may be used for the construction of interior, and/or exterior floors, walls, and ceilings. In the embodiments, the backer board is made partially or wholly from the compositions provided herein. Another type of construction panel formed from the compositions provided herein is drywall. The drywall includes board that is used for construction of interior, and/or exterior floors, walls, and ceilings. Traditionally, drywall is made from gypsum (called paper-faced board). In some embodiments, the drywall is made partially or wholly from the compositions provided herein thereby replacing gypsum from the drywall product. In some embodiments, the drywall may comprise construction panels prepared as a combination of aragonitic cement and/or calcite (e.g., setting and hardening when vaterite transforms to aragonite and/or calcite) and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, etc., that have been described herein. In some embodiments, the drywall is panel made of a paper liner wrapped around an inner core. For example, in some embodiments, during the process of making the drywall product from the compositions provided herein, the slurry of the compositions provided herein is poured over a sheet of paper. Another sheet of paper is then put on top of the slurry such that the slurry is flanked by the paper on both sides (the resultant composition sandwiched between two sheets of outer material, e.g., heavy paper or fiberglass mats). The reactive vaterite in the compositions provided herein is then transformed to the aragonite and/or the calcite (using additives and/or heat) or the aragonite and/or the calcite in the composition then sets and hardens. When the core sets and is dried in a large drying chamber, the sandwich becomes rigid and strong enough for use as a building material. The drywall sheets are then cut and separated.

The flexural and compressive strengths of the drywall formed from the compositions provided herein are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. In some embodiments, the formed building materials such as, the construction panels such as, but not limited to, cement boards and drywall produced by the methods and systems described herein, have low density and high porosity making them suitable for lightweight and insulation applications. The high porosity and light weight of the formed building materials such as construction panels may be e.g., due to the development of the aragonitic and/or calcitic microstructure. In some embodiments, the transformation of the reactive vaterite during dissolution/re-precipitation process may lead to micro porosity generation while at the same time the voids created between the aragonitic crystals formed may provide nano porosity thereby leading to highly porous and light weight structure. Certain admixtures may be added during the transformation process such as, but not limited to, foaming agents, rheology modifiers and mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the precipitation material and water.

One of the applications of the cement board or drywall is fiber cement siding. Fiber-cement sidings formed by the methods and systems provided herein comprise construction panels prepared as a combination of the aragonitic cement and/or the calcite, aggregate, interwoven cellulose, and/or polymeric fibers and may possess a texture and flexibility that resembles wood.

In some embodiments, the formed building materials are masonry units. Masonry units are formed building materials used in the construction of load-bearing and non-load-bearing structures that are generally assembled using mortar, grout, and the like. Exemplary masonry units formed from the compositions include bricks, blocks, and tiles.

Another formed building material formed from the compositions described herein is a conduit. Conduits are tubes or analogous structures configured to convey a gas or liquid, from one location to another. Conduits can include any number of different structures used in the conveyance of a liquid or gas that include, but are not limited to, pipes, culverts, box culverts, drainage channels and portals, inlet structures, intake towers, gate wells, outlet structures, and the like.

Another formed building material formed from the compositions described herein is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material formed from the compositions described herein is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways and cantilevers.

Another formed building material formed from the compositions described herein is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts.

Another formed building material formed from the compositions described herein is a concrete slab. Concrete slabs are those building materials used in the construction of prefabricated foundations, floors, and wall panels. In some instances, a concrete slab may be employed as a floor unit (e.g., hollow plank unit or double tee design).

Another formed building material formed from the compositions described herein is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material formed from the compositions described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; hazardous material storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

In some embodiments, the methods described herein include making artificial marine structures from the compositions described herein including, but not limited to, artificial corals and reefs. In some embodiments, the artificial structures can be used in the aquariums or sea. In some embodiments, the aragonitic cement and/or the calcite provides neutral or close to neutral pH which may be conducive for maintenance and growth of marine life. The aragonitic reefs may provide suitable habitat for marine species.

In some embodiments, the methods and systems described herein include making other products from the composition provided herein including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular composition, that composition can be used in various embodiments of compositions of the present invention and/or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

Certain ranges are presented herein with numerical values being preceded by the term "about." The term "about" is used herein to provide literal support for the exact number that it precedes, as well as a number that is near to or approximately the number that the term precedes. As used herein, the term "about" refers to a ±10% variation from the nominal value unless otherwise indicated or inferred.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. It should be understood that the order of steps or order for performing certain actions is immaterial so long as the present invention remain operable. Moreover, two or more steps or actions may be conducted simultaneously.

The following examples are put forth so as to provide those of ordinary skill in the art with a complete disclosure and description of how to make and use the invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for.

Unless indicated otherwise, parts are parts by weight, molecular weight is weight average molecular weight, temperature is in degrees Centigrade, and pressure is at or near atmospheric.

EXAMPLES

Example 1

Dissolution of the Cement in the Ammonium Salt Solution 5.6 grams of Type II/V Portland cement and 9.9 grams of ammonium chloride were combined with sufficient water to make a 100 mL slurry in a lightly capped volumetric flask. The solution was kept agitated by a stir bar. The solution was sampled, filtered, and then titrated for calcium utilizing ethylenediaminetetraacetic acid (EDTA). After 30 minutes and 25.67 hours, the calcium concentration of the solution was 0.39 and 0.43 M, respectively. The concentration of the solution after approximately 1 day of extraction was utilized to determine the ratios of Portland cement to the ammonium chloride utilized in Example 2 below.

Example 2

Treatment with Carbon Dioxide to Form Reactive Vaterite Cement

Three 4 L feed solutions were prepared according to Table 1 provided below. After approximately 24 hours, the solutions were filtered as necessary and used as feedstock for a carbon dioxide absorption reaction. Solutions F1 and F3 were stirred for 24 hours in a 4 L Erlenmeyer flask using a stir bar. Solution F2 was ball milled for 5 hours, then left still for 19 hours prior resuspension and filtration. The calcium plus magnesium and calcium only concentrations were determined by titration with EDTA and are given in Table 1. No significant amount of magnesium was solubilized and any variation in the concentrations of the feed solutions was attributed to experimental variability. Ball milling the feed solution resulted in 0.08 M more calcium coming into solution.

TABLE 1

Carbon dioxide absorption reactions' feed solutions

| Solution Name | Filtered | Ball Milled | Type II/V Cement (g) | NH4Cl [M] | Ca + Mg [M] | Ca [M] |
|---|---|---|---|---|---|---|
| F1 | ✓ | x | 369.5 | 1.9 | 0.65; 0.66 | 0.65; 0.65 |
| F2 | ✓ | ✓ | 369.5 | 1.9 | 0.73; 0.70 | 0.73; 0.73 |
| F3 | x | x | 369.5 | 1.9 | 0.65; 0.65 | 0.67; 0.63 |

The carbon dioxide absorption reactor was a baffled continuous stir tanked reactor with a 1.1 L volume and a 2:1 height to width ratio. The gas flow into the reactor was 0.6 standard liters per minute (slpm) carbon dioxide and 2.4 slpm nitrogen. The conditions of the reaction are summarized in Table 2. The reactor was started up by filling the reactor with 1.9 M ammonium chloride and 0.15 M calcium oxide solution. The calcium oxide reacted with the ammonium chloride to form calcium chloride and ammonia in solution. Once the reactor reached a pH of 8, then F1 began flowing into the reactor. The feed solutions were run sequentially with F2 beginning immediately after F1, and F3 beginning immediately after F2 without any interruption.

TABLE 2

Carbon dioxide absorption reaction summary

| Feed Solution | Sample | pH | Temperature (° C.) | Flow Rate Average (mL/min) | Sample Volume (mL) |
|---|---|---|---|---|---|
| F1 | F1_S01 | 7.96 | 37.8 | 41.5 | 850 |
| F1 | F1_S02 | 7.96 | 39.3 | 41.5 | 850 |
| F1 | F1_S03 | 8.00 | 40.0 | 41.5 | 850 |
| F1 | F1_S04 | 7.98 | 40.4 | 41.5 | 850 |
| F1 | F1_S05 | 7.97 | 40.4 | 41.5 | 400 |
| F2 | F2_S01 | 8.03 | 40.5 | 45.9 | 900 |
| F2 | F2_S02 | 7.89 | 40.8 | 45.9 | 900 |
| F2 | F2_S03 | 7.96 | 40.8 | 45.9 | 900 |
| F2 | F2_S04 | 7.99 | 40.8 | 45.9 | 900 |
| F3 | F3_S01 | 8.07 | 41.0 | 41.7 | 1000 |
| F3 | F3_S02 | 8.02 | 41.5 | 41.7 | 1000 |
| F3 | F3_S03 | 7.99 | 41.5 | 41.7 | 1000 |
| F3 | F3_S04 | 8.09 | 41.9 | 41.7 | 1000 |
| Reactor Residual | — | 8.00 | 41.9 | — | 1100 |

The results of the carbon dioxide absorption reaction are given in Table 3. The calcium carbonate produced by absorbing carbon dioxide was predominately vaterite. The vaterite percentage was determined by quantitative X-ray diffraction. There were less insoluble solids filtered from the Feed Solution F2 compared to F 1, which agrees with the higher calcium concentration in the Feed Solution F2 as a result of the ball milling. Additionally, the ball milling reduced the median size of the insoluble solid from 11.2 μm to 5.2 μm.

TABLE 3

Carbon dioxide absorption reaction results summary

| Feed Solution | Sample | Solids (g) | Vaterite (%)* | Median Size (μm) | Filtrate Ca [M] | ΔCa in reactor [M] |
|---|---|---|---|---|---|---|
| F1 | F1_S01 | 9.2 | >99.5 | 13.5 | 0.12 | 0.53 |
| | F1_S02 | 18.7 | >99.5 | 18.0 | | |
| | F1_S03 | 24.1 | >99.5 | 20.5 | | |
| | F1_S04 | 27.5 | >99.5 | 22.8 | | |
| | F1_S05 | 10.3 | >99.5 | 18.0 | | |
| | Insoluble Solid | 236.3 | n.a. | 11.2 | n.a. | n.a. |
| F2 | F2_S01 | 34.0 | 99.4 | 24.5 | 0.23 | 0.50 |
| | F2_S02 | 29.2 | 98.2 | 24.2 | | |
| | F2_S03 | 33.2 | 99.0 | 22.5 | | |
| | F2_S04 | 29.5 | 96.5 | 24.8 | | |
| | Insoluble Solid | 226.0 | n.a. | 5.2 | n.a. | n.a. |
| F3 | F3_S01 | 51.9 | 95.2 | 10 | 0.22 | 0.43 |
| | F3_S02 | 72.7 | 97.1 | 8.8 | | |
| | F3_S03 | 83.1 | 95.4 | 8.1 | | |
| | F3_S04 | 97.7 | 92.7 | 8.1 | | |
| Reactor Residual | — | 214.2 | n.a. | 16.4 | n.d. | n.d. |

*Based on calcium carbonate total, calculation ignores any insoluble solid that is not calcium carbonate in F3.

Comparing F1 and F3, neither feed solution was ball milled and F1 was filtered prior to carbonation while F3 contained all the insoluble solid in the aqueous solution. Comparing for example, feed S03 for F1 and F3 as the steady-state material produced from the reactor, the median particle size of the vaterite was 20.5 μm and 8.1 μm, respectively. This showed that by allowing the insoluble solid to remain in the aqueous solution during the carbonation or the precipitation reaction the median size of the vaterite particles decreased. This demonstrated the nucleation or the seeding effect of the insoluble solid on the precipitation as well as the particle size. The effect of the insoluble solid comprising the C—S—H seed particle(s) has been described in detail herein.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A method to form a composition, comprising: (i) dissolving cement and/or cement clinker in N-containing salt solution to produce an aqueous solution comprising calcium salt and form a gaseous stream comprising ammonia; and (ii) treating the aqueous solution comprising calcium salt with a gaseous stream comprising carbon dioxide and the gaseous stream comprising ammonia to form a composition comprising calcium carbonate.

2. The method of claim 1, further comprising forming a gaseous stream comprising ammonia in step (i);

recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combination thereof; and treating the aqueous solution comprising calcium salt with the second aqueous solution comprising ammonium bicarbonate, ammonium carbonate, ammonia, ammonia carbamate, or combination thereof to form the composition comprising calcium carbonate.

3. The method of claim 1, wherein the cement and/or the cement clinker is Portland cement and/or Portland cement clinker.

4. The method of claim 1, wherein the cement and/or the cement clinker comprises lime and/or one or more components selected from the group consisting of calcium carbonate, silica, aluminate, sulfate, silicate, ferrite, alite, belite, amorphous phase, and combination thereof.

5. The method of claim 1, further comprising grinding or ball milling the cement and/or the cement clinker before the dissolving step wherein the grinding or the ball milling exposes a fresh calcium rich surface.

6. The method of claim 1, further comprising producing the cement and/or the cement clinker by calcining limestone in a kiln to produce the cement and/or the cement clinker and the gaseous stream comprising carbon dioxide; and circulating the gaseous stream comprising carbon dioxide to the treating and/or the recovering step.

7. The method of claim 6, further comprising operating the kiln at a high lime saturation factor (LSF) in a range of between about 0.98-1 or above 1.

8. The method of claim 1, further comprising forming an insoluble solid in the aqueous solution during and/or after the dissolving step, wherein the insoluble solid comprises pozzolanic material or C—S—H seed particle(s).

9. The method of claim 8, wherein the insoluble solid further comprises one or more components selected from the group consisting of calcium carbonate, silica, aluminate, sulfate, silicate, ferrite, alite, belite, and combination thereof.

10. The method of claim 8, further comprising separating the insoluble solid from the aqueous solution before the treatment step and adding the separated insoluble solid to the composition comprising calcium carbonate, or combination thereof.

11. The method of claim 8, further comprising subjecting the aqueous solution comprising calcium salt and insoluble solid to the treatment step to produce the composition comprising calcium carbonate and insoluble solid, wherein the insoluble solid comprises C—S—H seed particle(s).

12. The method of claim 8, further comprising providing acceleration of hydration of the composition comprising calcium carbonate, acceleration of precipitation of the composition comprising calcium carbonate, reduction of median particle size of the composition comprising calcium carbonate, or combination thereof, by the insoluble solid comprising C—S—H seed particle(s).

13. The method of claim 8, wherein the insoluble solid is between about 1-85 wt % in the aqueous solution, in the composition, or combination thereof.

14. The method of claim 1, wherein the cement is a blend comprising Portland cement or Portland cement clinker and one or more components selected from the group consisting of gypsum, aluminosilicate material, and combination thereof.

15. The method of claim 1, wherein the N-containing salt is selected from the group consisting of ammonium halide, ammonium acetate, ammonium sulfate, ammonium sulfite, ammonium nitrate, ammonium nitrite, and combination thereof.

16. The method of claim 1, wherein the calcium carbonate is in polymorphic form of vaterite, aragonite, calcite, or combination thereof.

17. The method of claim 16, wherein the vaterite is reactive vaterite.

18. The method of claim 17, further comprising adding water to the composition comprising calcium carbonate wherein the calcium carbonate is in polymorphic form of reactive vaterite and transforming the reactive vaterite to aragonite and/or calcite that sets and hardens to form cement or cementitious product.

19. The method of claim 18, wherein the cementitious product is building material, formed building material, aggregate, aerated concrete, or combination thereof.

* * * * *